United States Patent
Chen et al.

(10) Patent No.: US 11,402,675 B1
(45) Date of Patent: Aug. 2, 2022

(54) VIEWING ANGLE SWITCH MODULE AND DISPLAY APPARATUS

(71) Applicant: Coretronic Corporation, Hsin-Chu (TW)

(72) Inventors: Yu-Fan Chen, Hsin-Chu (TW); Ping-Yen Chen, Hsin-Chu (TW); Chung-Yang Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/534,432

(22) Filed: Nov. 23, 2021

(30) Foreign Application Priority Data

Feb. 24, 2021 (CN) .......................... 202120409196.5

(51) Int. Cl.
*G02F 1/1335* (2006.01)
*G02F 1/13* (2006.01)
*G02F 1/1334* (2006.01)
*G02F 1/1337* (2006.01)

(52) U.S. Cl.
CPC ............ *G02F 1/132* (2013.01); *G02F 1/1334* (2013.01); *G02F 1/133528* (2013.01); *G02F 1/133753* (2013.01)

(58) Field of Classification Search
CPC .............................................. G02F 1/133528
See application file for complete search history.

(56) References Cited

U.S. PATENT DOCUMENTS

2007/0085957 A1* 4/2007 Jin ...................... G02F 1/1323
349/74
2021/0333580 A1* 10/2021 Matsushima ....... G02F 1/13471

FOREIGN PATENT DOCUMENTS

| CN | 208126055 | 11/2018 |
| CN | 211554556 | 9/2020 |
| TW | 201202799 | 1/2012 |
| TW | I679472 | 12/2019 |

* cited by examiner

*Primary Examiner* — Edmond C Lau
(74) *Attorney, Agent, or Firm* — JCIPRNET

(57) ABSTRACT

A viewing angle switch module includes a viewing angle limiter, a first electronically controlled viewing angle switch, a second electronically controlled viewing angle switch, a first polarizer, and a second polarizer. The viewing angle limiter has an absorption axis, and an axial direction of the absorption axis is parallel to a thickness direction of the viewing angle limiter. The viewing angle limiter, the first electronically controlled viewing angle switch, the first polarizer, the second electronically controlled viewing angle switch, and the second polarizer are overlapped. An axial direction of a first absorption axis of the first polarizer is parallel to an axial direction of a second absorption axis of the second polarizer. A display apparatus adopting the viewing angle switch module is also provided. The viewing angle switch module and the display apparatus provided by the invention have better light energy utilization rate.

13 Claims, 22 Drawing Sheets

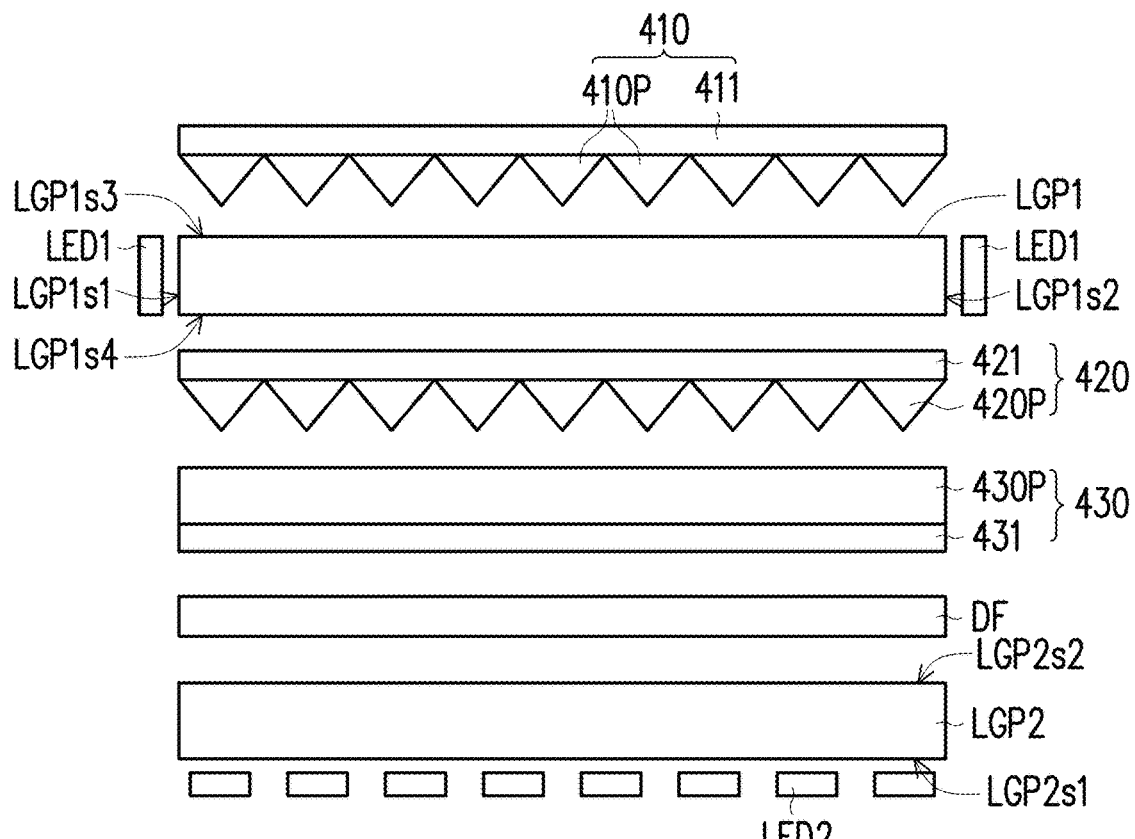
FIG. 5A     BLU-A
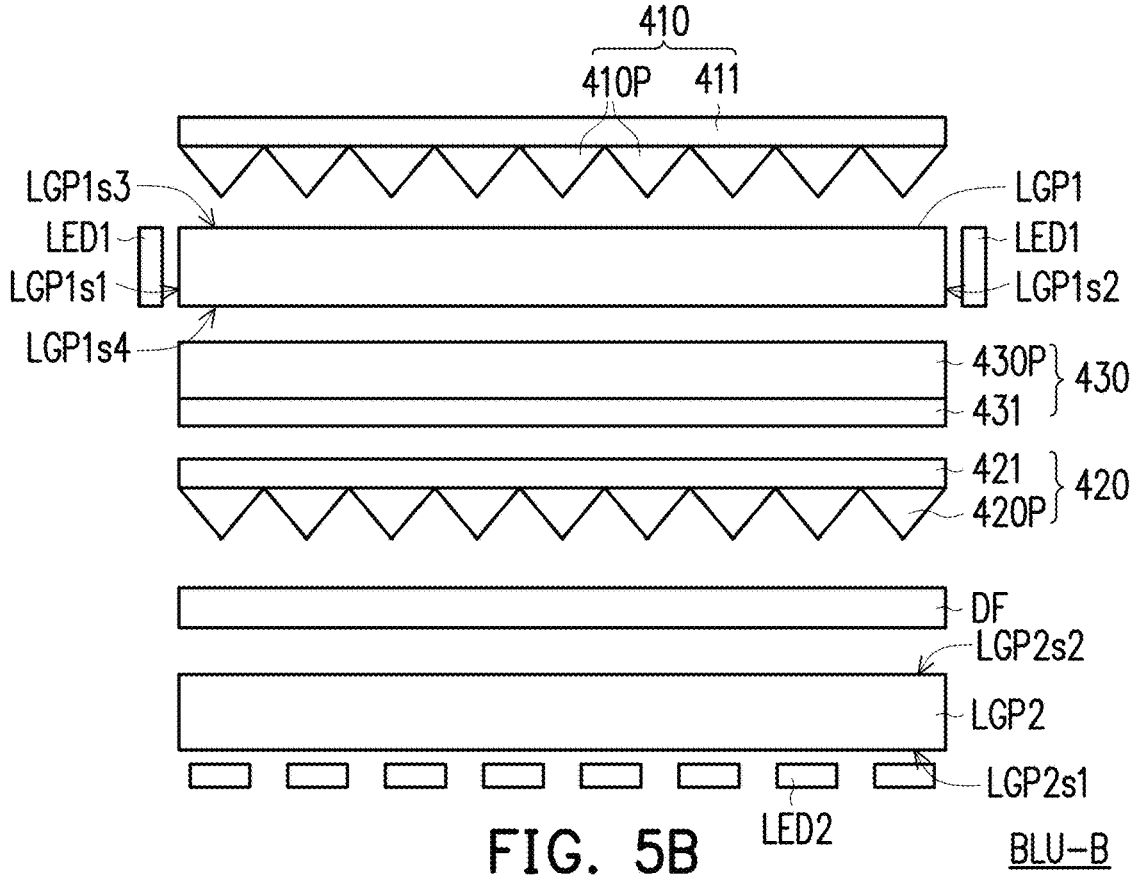
FIG. 5B     BLU-B

VIEWING ANGLE SWITCH MODULE AND DISPLAY APPARATUS

CROSS-REFERENCE TO RELATED APPLICATION

This application claims the priority benefit of China application serial no. 202120409196.5, filed on Feb. 24, 2021. The entirety of the above-mentioned patent application is hereby incorporated by reference herein and made a part of this specification.

BACKGROUND OF THE INVENTION

Field of the Invention

The invention relates to a viewing angle switching technique, and in particular to a viewing angle switch module and a display apparatus.

Description of Related Art

Generally speaking, in order to allow a plurality of viewers to watch a display apparatus together, the display apparatus usually has a wide viewing angle display effect. However, in certain situations or occasions, such as browsing private web pages or confidential information, or entering passwords in public, the wide viewing angle display effect is likely to cause confidential information to be seen by others and cause confidential information to leak. In order to achieve anti-peep effect, the general approach is to place a light control film (LCF) in front of the display panel to filter out large-angle light. Conversely, when there is no need for anti-peep, the light control film is manually removed from the front of the display panel. In other words, although this type of light control film has anti-peep effect, there is still room for improvement in the convenience of the operation thereof. Therefore, how to develop a display apparatus with extremely convenient viewing angle switching and excellent anti-peep effect has become an important issue for concerned manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display apparatus that is more convenient to switch between anti-peep mode and sharing mode, and also has lower energy consumption.

The invention provides a viewing angle switch module having a better light energy utilization rate.

In order to achieve one or part or all of the above objectives or other objectives, an embodiment of the invention provides a display apparatus. The display apparatus includes a backlight module, a viewing angle limiter, a first electronically controlled viewing angle switch, a second electronically controlled viewing angle switch, a first polarizer, a second polarizer, and a display panel. The viewing angle limiter and the display panel are overlapped with the backlight module, and the viewing angle limiter has an absorption axis. An axial direction of the absorption axis is parallel to a thickness direction of the viewing angle limiter. The first electronically controlled viewing angle switch is overlapped with the viewing angle limiter, and includes a first liquid crystal layer, a first alignment layer, and a second alignment layer. The first liquid crystal layer is sandwiched between the first alignment layer and the second alignment layer. A first alignment direction of the first alignment layer is parallel or perpendicular to a second alignment direction of the second alignment layer. The second electronically controlled viewing angle switch is overlapped with the first electronically controlled viewing angle switch, and includes a second liquid crystal layer, a third alignment layer, and a fourth alignment layer. The second liquid crystal layer is sandwiched between the third alignment layer and the fourth alignment layer. A third alignment direction of the third alignment layer is parallel to a fourth alignment direction of the fourth alignment layer. The first polarizer is disposed between the first electronically controlled viewing angle switch and the second electronically controlled viewing angle switch. The first electronically controlled viewing angle switch is located between the viewing angle limiter and the first polarizer. The second polarizer is disposed at one side of the second electronically controlled viewing angle switch away from the first electronically controlled viewing angle switch. An axial direction of a first absorption axis of the first polarizer is parallel to an axial direction of a second absorption axis of the second polarizer.

In order to achieve one or part or all of the above objectives or other objectives, an embodiment of the invention provides a viewing angle switch module. The viewing angle switch module includes a viewing angle limiter, a first electronically controlled viewing angle switch, a second electronically controlled viewing angle switch, a first polarizer, and a second polarizer. The viewing angle limiter has an absorption axis, and an axial direction of the absorption axis is parallel to a thickness direction of the viewing angle limiter. The first electronically controlled viewing angle switch is overlapped with the viewing angle limiter, and includes a first liquid crystal layer, a first alignment layer, and a second alignment layer. The first liquid crystal layer is sandwiched between the first alignment layer and the second alignment layer. A first alignment direction of the first alignment layer is parallel or perpendicular to a second alignment direction of the second alignment layer. The second electronically controlled viewing angle switch is overlapped with the first electronically controlled viewing angle switch, and includes a second liquid crystal layer, a third alignment layer, and a fourth alignment layer. The second liquid crystal layer is sandwiched between the third alignment layer and the fourth alignment layer. A third alignment direction of the third alignment layer is parallel to a fourth alignment direction of the fourth alignment layer. The first polarizer is disposed between the first electronically controlled viewing angle switch and the second electronically controlled viewing angle switch. The first electronically controlled viewing angle switch is located between the viewing angle limiter and the first polarizer. The second polarizer is disposed at one side of the second electronically controlled viewing angle switch away from the first electronically controlled viewing angle switch. An axial direction of a first absorption axis of the first polarizer is parallel to an axial direction of a second absorption axis of the second polarizer.

Based on the above, in the viewing angle switch module and the display apparatus of an embodiment of the invention, via the absorption characteristics of the viewing angle limiter in a specific direction and the cooperation with the two electronically controlled viewing angle switches, the light energy utilization rate of the viewing angle switch module may be increased, thereby reducing the operating energy consumption of the display apparatus. At the same time, the anti-peep effect of the display apparatus under a large viewing angle may also be improved. Moreover, the electronically controllable features of the two electronically controlled viewing angle switches make it extremely convenient for the display apparatus to switch between anti-peep mode and sharing mode.

Other objectives, features and advantages of the invention will be further understood from the further technological features disclosed by the embodiments of the invention wherein there are shown and described preferred embodiments of this invention, simply by way of illustration of modes best suited to carry out the invention.

In order to make the above features and advantages of the invention better understood, embodiments are specifically provided below with reference to figures for detailed description as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A and FIG. 5B are schematic side views of backlight modules of some other embodiments of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
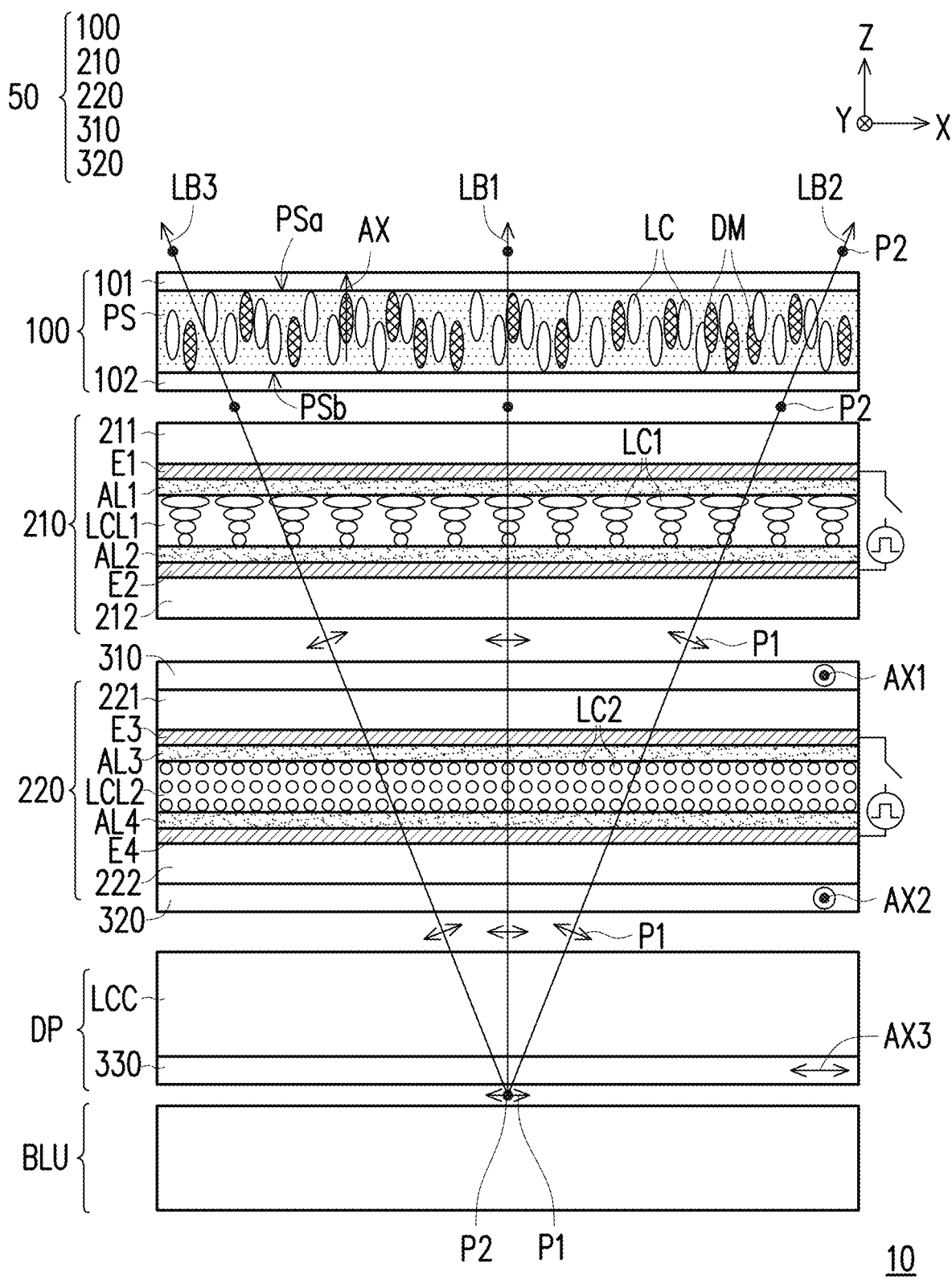
FIG. 1A and FIG. 1B are schematic cross-sectional views of the display apparatus of the first embodiment of the invention operated in sharing mode and anti-peep mode.
Figure 1B:
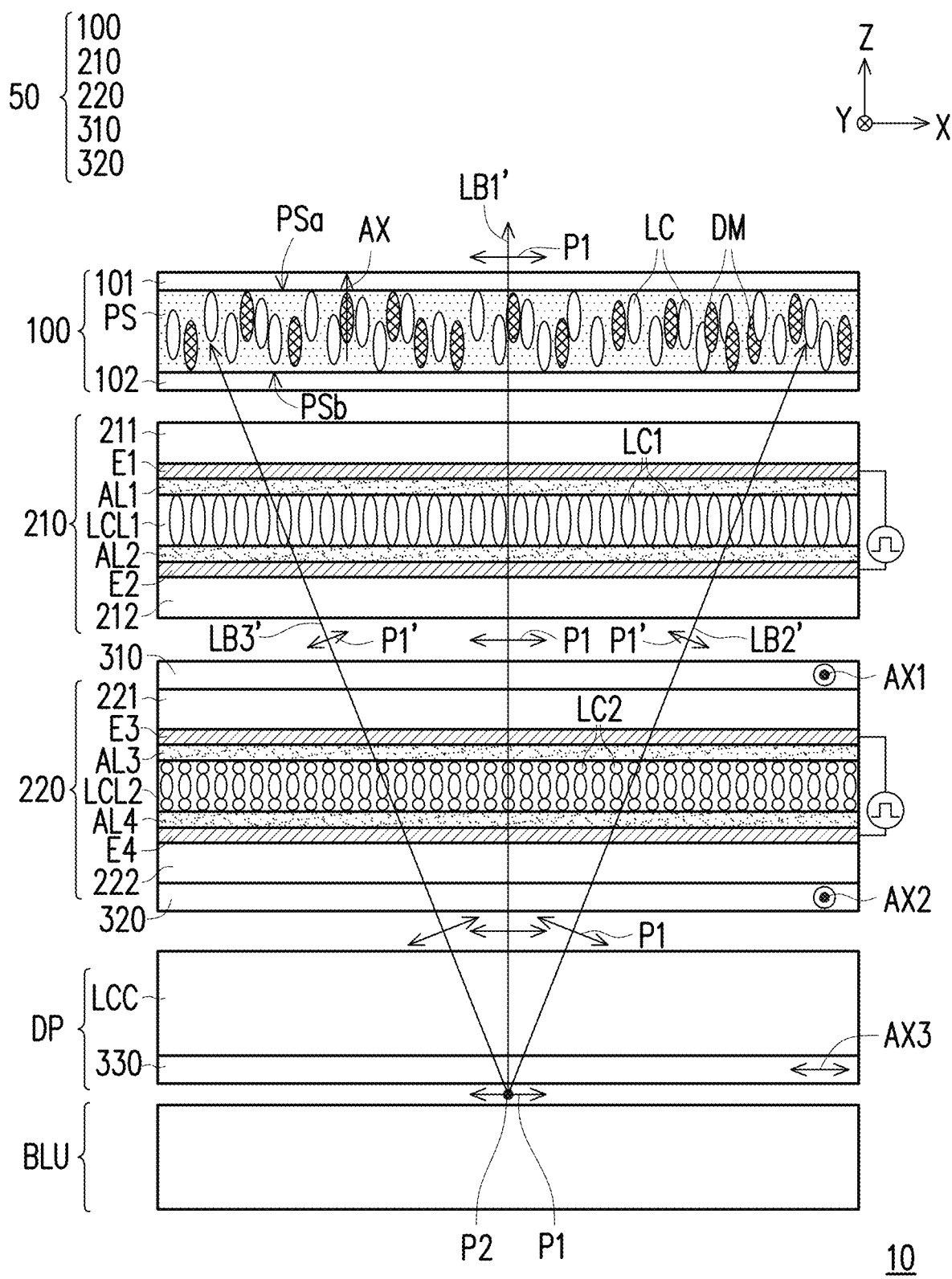
Figure 2:
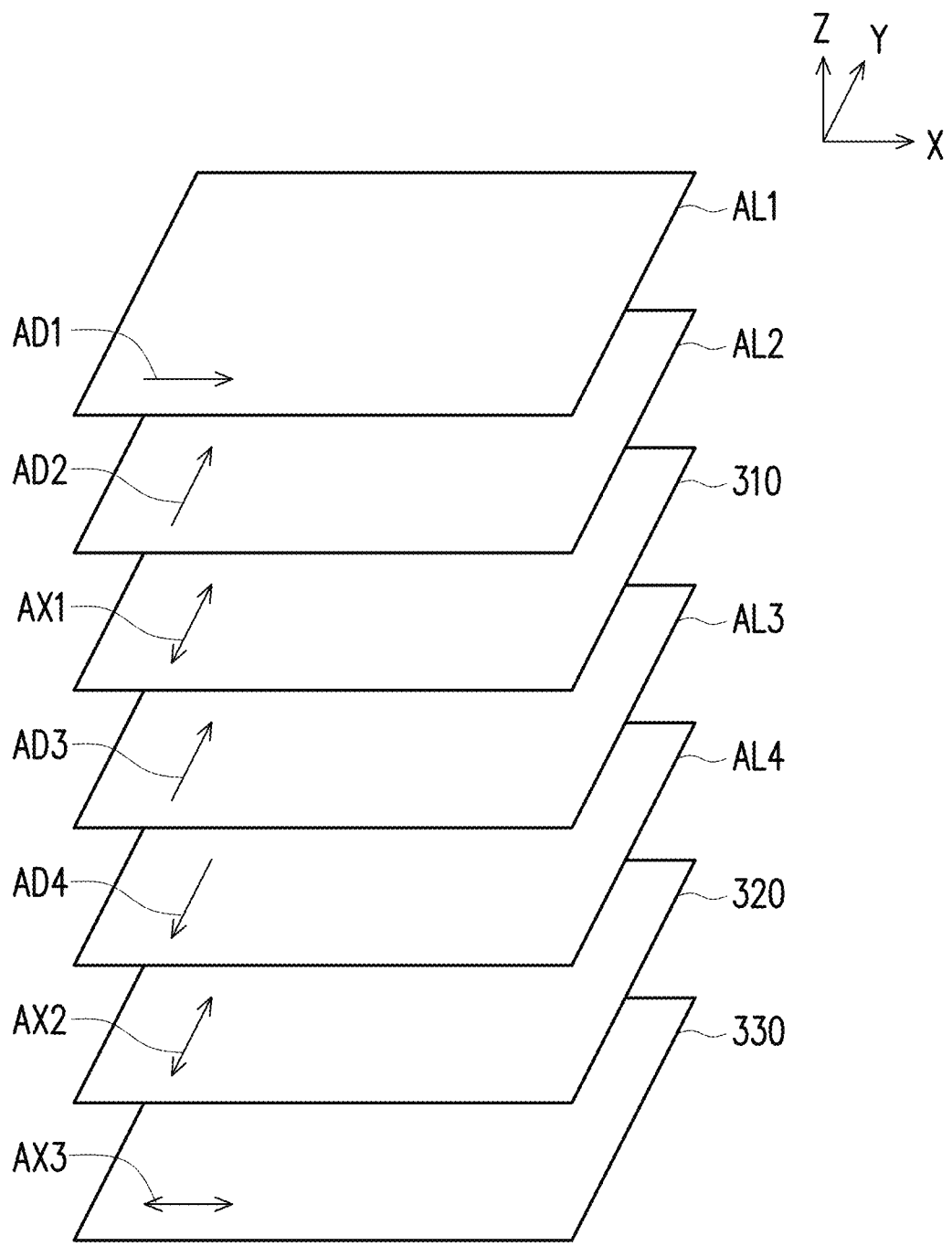
FIG. 2 is a schematic diagram of a portion of the film layers of the display apparatus of FIG. 1A.
Figure 3A:
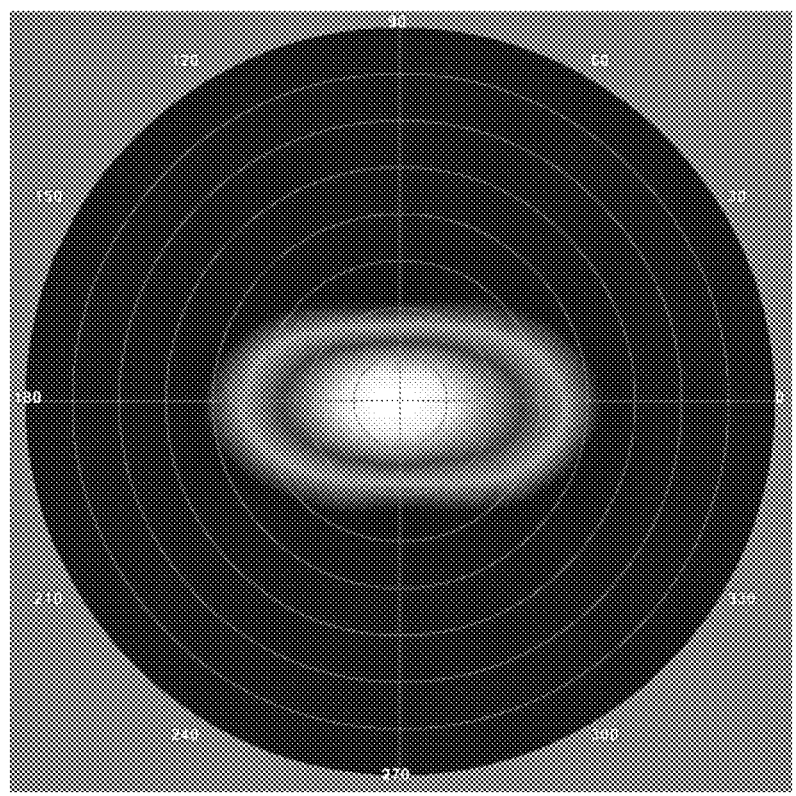
FIG. 3A is a transmittance distribution diagram of the display apparatus of FIG. 1A operated in sharing mode.
Figure 3B:
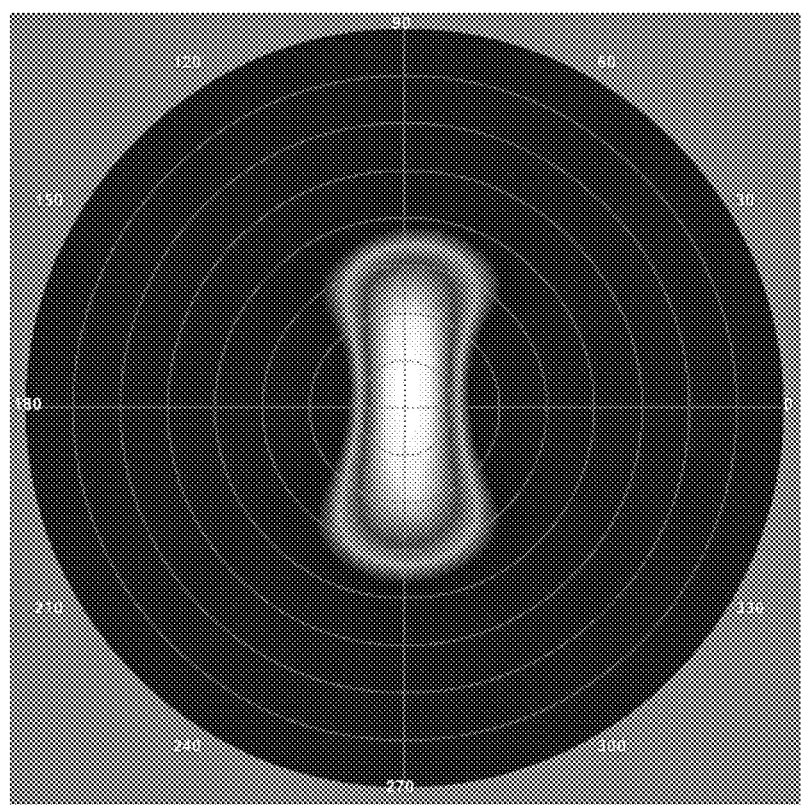
FIG. 3B is a transmittance distribution diagram of the display apparatus of FIG. 1B operated in anti-peep mode.
Figure 4:
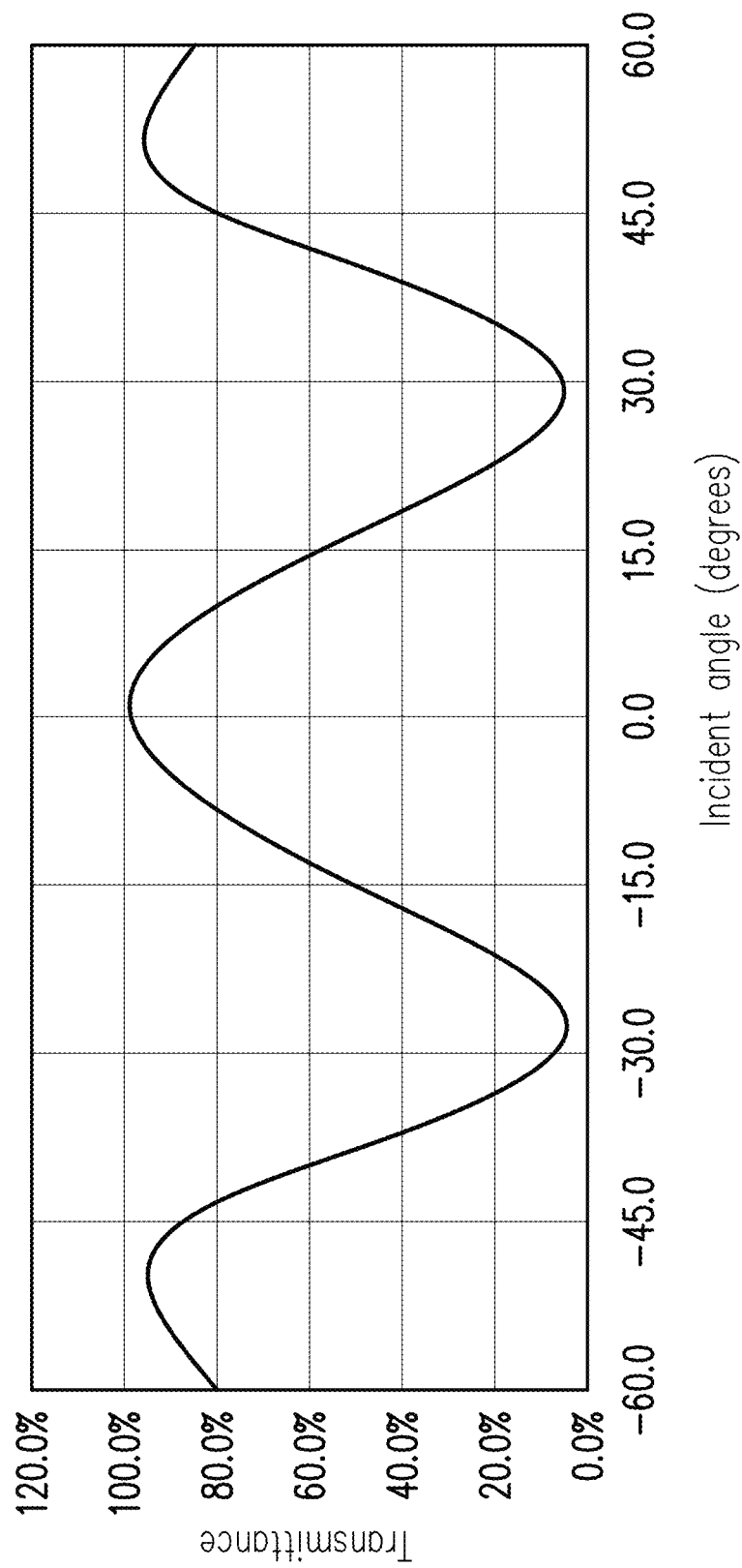
FIG. 4 is a graph of viewing angle versus transmittance of the second electronically controlled viewing angle switch of FIG. 1A.

FIG. 1A and FIG. 1B are schematic cross-sectional views of the display apparatus of the first embodiment of the invention operated in sharing mode and anti-peep mode. FIG. 2 is a schematic diagram of a portion of the film layers of the display apparatus of FIG. 1A. FIG. 3A is a transmittance distribution diagram of the display apparatus of FIG. 1A operated in sharing mode. FIG. 3B is a transmittance distribution diagram of the display apparatus of FIG. 1B operated in anti-peep mode. FIG. 4 is a graph of viewing angle versus transmittance of the second electronically controlled viewing angle switch of FIG. 1A.

Please refer to FIG. 1A, FIG. 1B, and FIG. 2, a display apparatus 10 includes a backlight module BLU, a display panel DP, and a viewing angle switch module 50. The viewing angle switch module 50 is overlapped with the backlight module BLU, and includes a viewing angle limiter 100, a first electronically controlled viewing angle switch 210, a second electronically controlled viewing angle switch 220, a first polarizer 310, and a second polarizer 320. In the embodiment, the display panel DP is overlapped with the backlight module and disposed between the backlight module BLU and the viewing angle switch module 50. For example, the first electronically controlled viewing angle switch 210 and the second electronically controlled viewing angle switch 220 are disposed between the viewing angle limiter 100 and the display panel DP, the display panel DP is disposed between the second electronically controlled viewing angle switch 220 and the backlight module BLU, and the first electronically controlled viewing angle switch 210 is disposed between the viewing angle limiter 100 and the second electronically controlled viewing angle switch 220, but are not limited thereto. Specifically, the second electronically controlled viewing angle switch 220 is, for example, located between the display panel DP and the first electronically controlled viewing angle switch 210, and the display panel DP is, for example, located between the viewing angle limiter 100 and the backlight module BLU.

The viewing angle limiter 100 is overlapped with the backlight module BLU, the viewing angle limiter 100 has an absorption axis AX, and an axial direction of the absorption axis AX is parallel to the thickness direction (for example, a direction Z) of the viewing angle limiter 100. Specifically, the viewing angle limiter 100 includes a polymer substrate PS and a plurality of dye molecules DM. The dye molecules DM are dispersed in the polymer substrate PS. In the embodiment, the polymer substrate PS has a substrate surface PSa, and the axial direction of the absorption axis AX of the dye molecules DM (i.e., the axial direction of the absorption axis AX of the viewing angle limiter 100) may be perpendicular to the substrate surface PSa of the polymer substrate PS (the axial direction of the absorption axis AX is, for example, parallel to the stacking direction of the viewing angle limiter 100 and the display panel DP, such as the direction Z). It should be mentioned that, the dye molecules DM have a first absorption coefficient in the thickness direction of the viewing angle limiter 100 (that is, the normal direction of the substrate surface PSa, for example, the direction Z), and there is a second absorption coefficient perpendicular to the thickness direction (for example, a direction X or a direction Y), and the first absorption coefficient is different from the second absorption coefficient.

In the embodiment, the first absorption coefficient of the dye molecules DM is significantly greater than the second absorption coefficient, and the ratio of the first absorption coefficient to the second absorption coefficient is between 2 and 10000. Accordingly, the light filter effect of the viewing angle limiter 100 in the side viewing angle and the light transmittance in the viewing angle range may be effectively increased, thereby improving the anti-peep performance of the display apparatus 10 and the overall brightness of light from other angles of view after being emitted from the display apparatus 10. In a preferred embodiment, the ratio of the first absorption coefficient to the second absorption coefficient of the plurality of dye molecules DM may be between 100 and 1000 (or greater than 100). In another preferred embodiment, the ratio of the first absorption coefficient to the second absorption coefficient of the plurality of dye molecules DM may also be between 500 and 1000.

For example, the material of the dye molecules DM includes an azo-type compound or an anthraquinone-type compound, and the material of the polymer substrate PS includes a liquid crystal polymer. The liquid crystal polymer here may be formed by subjecting a liquid crystal mixed material layer to ultraviolet light irradiation, wherein the liquid crystal mixed material layer includes a plurality of liquid crystal molecules LC, a reactive mesogen with a specific doping concentration, and a photoinitiator. However, the invention is not limited thereto. According to other embodiments, the liquid crystal polymer may also be a material having a chemical functional group similar to a dichroic dye structure. That is, in the embodiment, the viewing angle limiter may not have the dye molecules DM.

In the embodiment, the viewing angle limiter 100 may also optionally include a protective layer 101 and a protective layer 102 respectively disposed on the substrate surface PSa and a substrate surface PSb at the opposite sides of the polymer substrate PS. The protective layer 101 and the protective layer 102 may be hard coat films, low-reflection films, anti-reflection films, anti-smudge films, anti-fingerprint films, anti-glare films, anti-scratch films, or a composite film layer of the above, but is not limited thereto.

The first electronically controlled viewing angle switch 210 is overlapped with the viewing angle limiter 100, and may optionally include a first substrate 211, a second substrate 212, a first electrode E1, a second electrode E2, and a first liquid crystal layer LCL1. The first electrode E1 and the second electrode E2 disposed oppositely are respectively disposed on the first substrate 211 and the second substrate 212. The first electrode E1 and the second electrode E2 are, for example, surface electrodes, but are not limited thereto. The first liquid crystal layer LCL1 is disposed between the first electrode E1 and the second electrode E2, and includes a plurality of liquid crystal molecules LC1. The material of the first substrate 211 and the second substrate 212 may include glass, quartz, organic polymer, or other suitable transparent materials. The first electrode E1 and the second electrode E2 are, for example, light-transmissive electrodes, and the material of the light-transmissive electrodes includes indium tin oxide, indium zinc oxide, aluminum tin oxide, aluminum zinc oxide, or other suitable oxides, a hollowed metal layer (metal mesh or wire grid), carbon nanotube, Ag nano-wire, graphene, or stacked layers of at least two of the above.

In order to allow the optical axis of the plurality of liquid crystal molecules LC1 of the first liquid crystal layer LCL1 to be arranged in a specific direction or in a specific distribution pattern without an external electric field (that is, when no voltage is applied between the two electrodes), the first electronically controlled viewing angle switch 210 further includes a first alignment layer AL1 and a second alignment layer AL2. The first alignment layer AL1 is disposed between the first electrode E1 and the first liquid crystal layer LCL1, the second alignment layer AL2 is disposed between the second electrode E2 and the first liquid crystal layer LCL1, and the first liquid crystal layer LCL1 is sandwiched between the first alignment layer AL1 and the second alignment layer AL2. In the embodiment, a first alignment direction AD1 of the first alignment layer AL1 is parallel to the direction X, and a second alignment direction AD2 of the second alignment layer AL2 is parallel to the direction Y. That is, the first alignment direction AD1 of the first alignment layer AL1 is substantially perpendicular to the second alignment direction AD2 of the second alignment layer AL2, but is not limited thereto. In other embodiments, the first alignment direction AD1 of the first alignment layer AL1 may be substantially parallel or anti-parallel to the second alignment direction AD2 of the second alignment layer AL2. More specifically, the liquid crystal molecules LC1 of the first liquid crystal layer LCL1 of the embodiment are arranged between the first alignment layer AL1 and the second alignment layer AL2 by means of twist deformation without an external electric field (as shown in FIG. 1A).

Similarly, the second electronically controlled viewing angle switch 220 is overlapped with the first electronically controlled viewing angle switch 210, and may optionally include a third substrate 221, a fourth substrate 222, a third electrode E3, a fourth electrode E4, and a second liquid crystal layer LCL2. The third electrode E3 and the fourth electrode E4 disposed oppositely are respectively disposed on the third substrate 221 and the fourth substrate 222. The third electrode E3 and the fourth electrode E4 are, for example, surface electrodes, but are not limited thereto. The second liquid crystal layer LCL2 is disposed between the third electrode E3 and the fourth electrode E4, and includes a plurality of liquid crystal molecules LC2. The material of the third substrate 221 and the fourth substrate 222 may include glass, quartz, organic polymer, or other suitable transparent materials. The third electrode E3 and the fourth electrode E4 are, for example, light-transmissive electrodes, and the material of the light-transmissive electrodes includes indium tin oxide, indium zinc oxide, aluminum tin oxide, aluminum zinc oxide, or other suitable oxides, a hollowed metal layer (metal mesh or wire grid), carbon nanotube, Ag nano-wire, graphene, or stacked layers of at least two of the above.

In order to allow the optical axis of the plurality of liquid crystal molecules LC2 of the second liquid crystal layer LCL2 to be arranged in a specific direction or in a specific distribution pattern without an external electric field (that is, when no voltage is applied between the two electrodes), the second electronically controlled viewing angle switch 220 further includes a third alignment layer AL3 and a fourth alignment layer AL4. The third alignment layer AL3 is disposed between the third electrode E3 and the second liquid crystal layer LCL2, the fourth alignment layer AL4 is disposed between the fourth electrode E4 and the second liquid crystal layer LCL2, and the second liquid crystal layer LCL2 is sandwiched between the third alignment layer AL3 and the fourth alignment layer AL4. In the embodiment, a third alignment direction AD3 (for example, the direction Y) of the third alignment layer AL3 is parallel or anti-parallel to a fourth alignment direction AD4 of the fourth alignment layer AL4. In other words, the liquid crystal molecules LC2 of the second liquid crystal layer LCL2 are substantially arranged between the third alignment layer AL3 and the fourth alignment layer AL4 in a manner parallel to direction Y.

It should be mentioned that, the included angle between the first alignment direction AD1 of the first alignment layer AL1 or the second alignment direction AD2 of the second alignment layer AL2 of the first electronically controlled viewing angle switch 210 (one of the first alignment direction AD1 and the second alignment direction AD2) and the third alignment direction AD3 of the third alignment layer AL3 of the second electronically controlled viewing angle switch 220 (or the fourth alignment direction AD4 of the fourth alignment layer AL4) is between 0 degrees and 45 degrees. For example, in the embodiment, the second alignment direction AD2 of the second alignment layer AL2 of the first electronically controlled viewing angle switch 210 may be parallel to the third alignment direction AD3 of the third alignment layer AL3 of the second electronically controlled viewing angle switch 220 (or anti-parallel to the fourth alignment direction AD4 of the fourth alignment layer AL4), but is not limited thereto.

Moreover, the first polarizer 310 and the second polarizer 320 of the viewing angle switch module 50 are respectively disposed at opposite sides of the second electronically controlled viewing angle switch 220. More specifically, the first polarizer 310 is disposed between the first electronically controlled viewing angle switch 210 and the second electronically controlled viewing angle switch 220, and the first electronically controlled viewing angle switch 210 is located between the viewing angle limiter 100 and the first polarizer 310, and the second polarizer 320 is disposed at one side of the second electronically controlled viewing angle switch 220 away from the first electronically controlled viewing angle switch 210. In the embodiment, the first polarizer 310 and the second polarizer 320 are, for example, respectively attached to two opposite sides of the second electronically controlled viewing angle switch 220, but are not limited thereto. It should be mentioned that, the axial direction of a first absorption axis AX1 of the first polarizer 310 is parallel to the axial direction of a second absorption axis AX2 of the second polarizer 320. In the embodiment, the axial direction of the first absorption axis AX1 of the first polarizer 310 and the axial direction of the second absorption axis AX2 of the second polarizer 320 may be parallel to the second alignment direction AD2 of the second alignment layer AL2 of the first electronically controlled viewing angle switch 210 (that is, parallel to the third alignment direction AD3 of the third alignment layer AL3 and the fourth alignment direction AD4 of the fourth alignment layer AL4 of the second electronically controlled viewing angle switch 220), but are not limited thereto.

The display panel DP includes a liquid crystal cell LCC and a third polarizer 330, and the third polarizer 330 is disposed at one side of the liquid crystal cell LCC away from the second electronically controlled viewing angle switch 220. The axial direction of a third absorption axis AX3 of the third polarizer 330 is perpendicular to the axial direction of the first absorption axis AX1 of the first polarizer 310 and the axial direction of the second absorption axis AX2 of the second polarizer 320. The liquid crystal cell LCC is suitable for rotating the polarization direction of the passing light beam by 90 degrees, for example. It should be mentioned that, unlike ordinary display panels, which mostly have upper and lower polarizers, since the second polarizer 320 of the embodiment is disposed (for example, attached) between the second electronically controlled viewing angle switch 220 and the display panel DP, the display panel DP only has a lower polarizer (that is, the third polarizer 330), and the upper polarizer of the display panel DP is replaced by the second polarizer 320 on the second electronically controlled viewing angle switch 220. In other words, the display panel DP and the second electronically controlled viewing angle switch 220 of the embodiment share the second polarizer 320 (common part). It should be understood that, in another embodiment, the second polarizer 320 may also be disposed at the upper surface of the display panel DP as a commonly used upper polarizer for the display panel DP. However, the invention is not limited thereto. In yet another embodiment, the two opposite surfaces of the display panel DP and the second electronically controlled viewing angle switch 220 may be respectively provided with two polarizers with the same absorption axis. That is, the display panel DP and the second electronically controlled viewing angle switch 220 may also not share a polarizer.

The following exemplarily describes the anti-peep mode and the sharing mode of the display apparatus 10 (for example, the display apparatus 10 is used to display a white screen, that is, an example of light-transmissive mode). Referring further to FIG. 1A and FIG. 1B, first, non-polarized light beams from the backlight module BLU, for example, a light beam LB1 emitted in the forward direction and two light beams LB2 and LB3 emitted obliquely, have a first linear polarization P1 after passing through the display panel DP. For example, the orthogonal projection of the polarization direction of the first linear polarization P1 on the third polarizer 330 may be parallel to the axial direction of the third absorption axis AX3 (after the light beam passes through the third polarizer 330, the polarization direction is rotated 90 degrees by the liquid crystal cell LCC), but is not limited thereto. In other embodiments, the light beam passing through the display panel DP may also have elliptical polarization, and the long axis of the elliptical polarization is substantially perpendicular to the second absorption axis AX2 of the second polarizer 320.

In the embodiment, when the display apparatus 10 is operated in sharing mode (as shown in FIG. 1A), both the first electronically controlled viewing angle switch 210 and the second electronically controlled viewing angle switch 220 are not enabled. That is, a voltage is not applied between the first electrode E1 and the second electrode E2 of the first electronically controlled viewing angle switch 210, and a voltage is not applied between the third electrode E3 and the fourth electrode E4 of the second electronically controlled viewing angle switch 220.

When an electric field is not applied to the second liquid crystal layer LCL2 of the second electronically controlled viewing angle switch 220, the plurality of liquid crystal molecules LC2 are arranged in parallel, for example, in a manner parallel to the axial direction of the second absorption axis AX2 of the second polarizer 320. Therefore, after the light beams (such as the light beam LB1 to the light beam LB3) from the display panel DP pass through the second polarizer 320, the second electrically controlled viewing angle switch 220, and the first polarizer 310 in order, the polarization states thereof and the intensity of the polarized electric field are not changed. Conversely, when an electric field is not applied to the first liquid crystal layer LCL1 of the first electronically controlled viewing angle switch 210, the plurality of liquid crystal molecules LC1 are arranged in a twisted deformation manner (for example, twisted 90 degrees). Therefore, after the light beam from the second electronically controlled viewing angle switch 220 passes through the first electronically controlled viewing angle switch 210, the polarization state thereof is changed from the first linear polarization P1 to a second linear polarization P2. The polarization direction of the first linear polarization P1 is, for example, perpendicular to the polarization direction of the second linear polarization P2.

When the light beam from the first electronically controlled viewing angle switch 210 enters the viewing angle limiter 100, the electric field polarization direction thereof is perpendicular to the axial direction of the absorption axis AX of the dye molecules DM. Therefore, both the light beam LB2 and the light beam LB3 incident obliquely or the light beam LB1 incident normally may pass through the viewing angle limiter 100 without substantial optical energy loss. In other words, the user may operate the display apparatus 10 in the direction X with a larger viewing angle range (as shown in FIG. 3A) to achieve the effect of display image sharing.

Furthermore, when the display apparatus 10 is operated in anti-peep mode (as shown in FIG. 1B), both the first electronically controlled viewing angle switch 210 and the second electronically controlled viewing angle switch 220 are enabled. That is, a voltage is applied between the first electrode E1 and the second electrode E2 of the first electronically controlled viewing angle switch 210, and a voltage is applied between the third electrode E3 and the fourth electrode E4 of the second electronically controlled viewing angle switch 220.

When an electric field is applied to the second liquid crystal layer LCL2 of the second electronically controlled viewing angle switch 220, a portion of the liquid crystal molecules LC2 is arranged obliquely on the YZ plane (for example, the included angle between the optical axis of the liquid crystal molecules LC2 and the film surface of the third alignment layer AL3 is greater than 45 degrees and less than or equal to 90 degrees). Therefore, after a light beam LB2' and a light beam LB3' incident obliquely pass through the second polarizer 320, the second electrically controlled viewing angle switch 220, and the first polarizer 310 in order, the polarization state thereof is changed into a first linear polarization P1' in which the intensity of the polarized electric field is weakened. After the light beam LB1' incident normally passes through the second polarizer 320, the second electronically controlled viewing angle switch 220, and the first polarizer 310 in order, the polarization state thereof and the intensity of the polarized electric field remain unchanged. That is, the light beam LB1' still has the first linear polarization P1 (i.e., the intensity of the polarized electric field of the first linear polarization P1' is less than the intensity of the polarized electric field of the first linear polarization P1).

In particular, the polarized electric field intensities of the polarization states of light beams incident on the second polarizer 320 at different oblique angles are weakened to different degrees. Specifically, via the above configuration of the second electronically controlled viewing angle switch 220 (that is, the relative relationship between the alignment direction of the second liquid crystal layer LCL2, the axial direction of the first absorption axis AX1 of the first polarizer 310, and the axial direction of the second absorption axis AX2 of the second polarizer 320), the second electronically controlled viewing angle switch 220 may have a cutoff effect (for example, the transmittance is less than 10%) with a specific viewing angle range. For example, when the total phase retardation of the second liquid crystal layer LCL2 is 2.24 microns, the second electronically controlled viewing angle switch 220 may have a cutoff effect with a viewing angle range of 24 degrees to 30 degrees (as shown in FIG. 4). When the viewing angle is larger (for example, greater than 35 degrees), the cutoff effect of the second electronically controlled viewing angle switch 220 is significantly worse. That is, when the display apparatus 10 is operated in anti-peep mode, the second electronically controlled viewing angle switch 220 is only used to achieve an anti-peep effect (or a cutoff effect) in a small viewing angle range (for example, a viewing angle range of 24 degrees to 30 degrees).

More specifically, when an electric field is applied to the first liquid crystal layer LCL1 of the first electronically controlled viewing angle switch 210, the plurality of liquid crystal molecules LC1 are substantially arranged in a manner perpendicular to the film surface of the first alignment layer AL1. Therefore, after the light beam from the second electronically controlled viewing angle switch 220 passes through the first electronically controlled viewing angle switch 210, the polarization state thereof is not substantially changed. Therefore, the light beam LB1' normally incident on the viewing angle limiter 100 is not absorbed because the electric field polarization direction thereof is perpendicular to the axial direction of the absorption axis AX of the dye molecules DM. The light components of the light beam LB2' and the light beam LB3' incident obliquely to the viewing angle limiter 100 and with an electric field polarization direction parallel to the absorption axis AX of the dye molecules DM are absorbed by the dye molecules DM. Due to the different optical path lengths of the light beams with different incident angles in the viewing angle limiter 100 and the different included angles between the polarization directions of the electric fields of the light beams and the absorption axis AX, the degree of absorption of the light component of the first linear polarization P1' is also different. For example: the greater the incident angle of the light, the more the light component of the first linear polarization P1' is absorbed by the dye molecules DM. Therefore, the viewing angle limiter 100 may have a light filter effect with a large viewing angle. It should be understood that the light filter effect of the viewing angle limiter 100 at the side viewing angle may also be adjusted by the addition concentration of the dye molecules DM, the absorption coefficient, or the change of the film thickness of the polymer substrate PS.

The light filter effect of the viewing angle limiter 100 in a large viewing angle and the cutoff effect of the second electronically controlled viewing angle switch 220 in a small viewing angle range allow the user to operate the display apparatus 10 in the direction X with a smaller viewing angle range (as shown in FIG. 3B), so as to achieve an anti-peep effect.

In the embodiment, the backlight module BLU may be a general backlight module, for example, including a light guide plate, a light-emitting element, a diffusion sheet, a prism sheet, and a reflective sheet, wherein the light guide plate has a light-incident surface, and a light-emitting surface and a bottom surface connected to the light-incident surface and opposite to each other. The light-emitting element is disposed at one side of the light-incident surface of the light guide plate, the diffusion sheet is disposed at one side of the light-emitting surface of the light guide plate, and the reflective sheet is disposed at one side of the bottom surface of the light guide plate. However, the invention is not limited thereto. In other embodiments, in order to achieve better anti-peep effect and sharing effect, the display apparatus may adopt a light-type switchable backlight module.

Figure 6A:
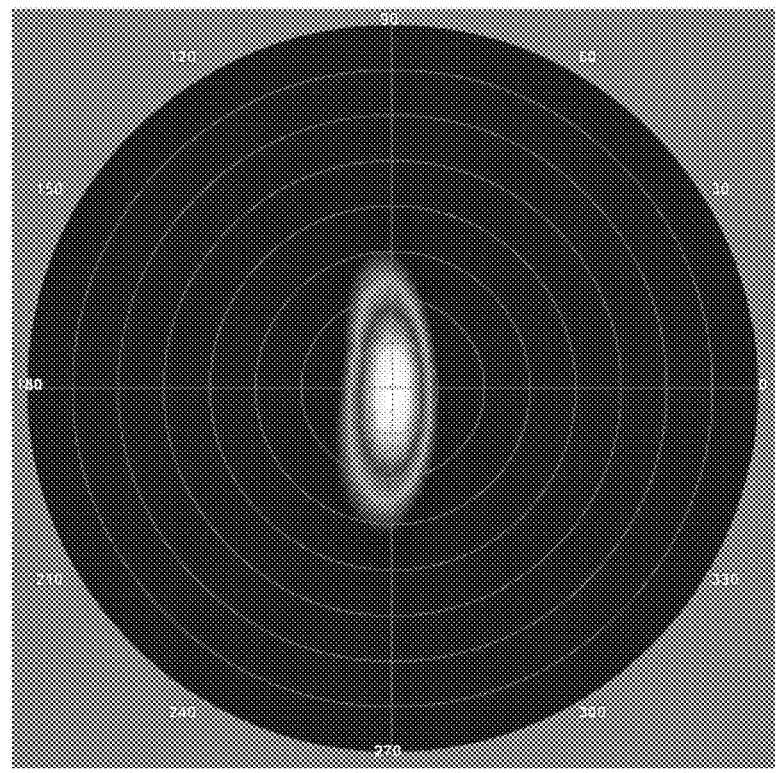
FIG. 6A is a transmittance distribution diagram of the display apparatus of FIG. 1B adopting the backlight module of FIG. 5A and operated in anti-peep mode.
Figure 6B:
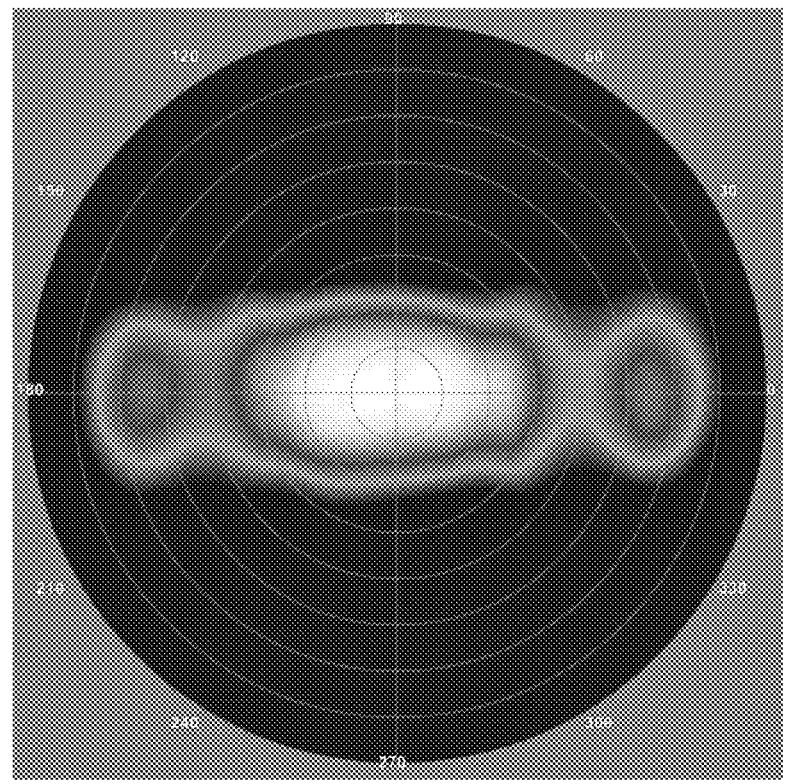
FIG. 6B is a transmittance distribution diagram of the display apparatus of FIG. 1A adopting the backlight module of FIG. 5A and operated in sharing mode.

FIG. 5A and FIG. 5B are schematic side views of backlight modules of some other embodiments of the invention. FIG. 6A is a transmittance distribution diagram of the display apparatus of FIG. 1B adopting the backlight module of FIG. 5A and operated in anti-peep mode. FIG. 6B is a transmittance distribution diagram of the display apparatus of FIG. 1A adopting the backlight module of FIG. 5A and operated in sharing mode. Referring to FIG. 1A, FIG. 1B, FIG. 5A, FIG. 6A, and FIG. 6B, the display apparatus of FIG. 5A differs from the display apparatus 10 of FIG. 1A only in: the backlight module BLU of FIG. 1A may be replaced by a backlight module BLU-A shown in FIG. 5A. The backlight module BLU-A includes a first light guide plate LGP1, a second light guide plate LGP2, a plurality of first light-emitting elements LED1, a plurality of second light-emitting elements LED2, a first prism sheet 410, a second prism sheet 420, a third prism sheet 430, and a diffusion sheet DF. The first light guide plate LGP1 has two light-incident surfaces LGP1s1 and LGP1s2 opposite to each other, and a light-emitting surface LGP1s3 and a bottom surface LGP1s4 connected to the two light-incident surfaces LGP1s1 and LGP1s2 and opposite to each other, and the first light guide plate LGP1 is, for example, an edge-type backlight light guide plate. The plurality of first light-emitting elements LED1 are respectively provided at both sides of the two light incident surfaces LGP1s1 and LGP1s2 of the first light guide plate LGP1, and the first prism sheet 410 is provided at one side of the light-emitting surface LGP1s3 thereof. A plurality of prism structures 410P of the first prism sheet 410 are located between a substrate 411 and the first light guide plate LGP1, that is, the first prism sheet 410 is a reverse prism sheet.

One side of the bottom surface LGP1s4 of the first light guide plate LGP1 is provided with the second light guide plate LGP2, and the second light guide plate LGP2 has a light incident surface LGP2s1 and a light-emitting surface LGP2s2 opposite to each other, wherein the light-emitting surface LGP2s2 faces the bottom surface LGP1s4 of the first light guide plate LGP1, and the second light guide plate LGP2 is, for example, a light guide plate of a direct-type backlight. The plurality of second light-emitting elements LED2 are disposed at one side of the light incident surface LGP2s1 of the second light guide plate LGP2. The second prism sheet 420, the third prism sheet 430, and the diffusion sheet DF are provided between the light-emitting surface LGP2s2 of the second light guide plate LGP2 and the bottom surface LGP1s4 of the first light guide plate LGP1, wherein the diffusion sheet DF is disposed closer to the position of the second light guide plate LGP2. Here, a plurality of prism structures 420P of the second prism sheet 420 and a plurality of prism structures 430P of the third prism sheet 430 are disposed opposite to each other. In other words, the prism structures 420P and the prism structures 430P are disposed between a substrate 421 of the second prism sheet 420 and a substrate 431 of the third prism sheet 430. That is, the second prism sheet 420 and the third prism sheet 430 are, for example, a reverse prism sheet and a prism sheet, but are not limited thereto. In other embodiments, referring to FIG. 5B at the same time, the difference between a backlight module BLU-B of FIG. 5B and the backlight module BLU-A of FIG. 5A is: the prism structures 420P of the second prism sheet 420 and the prism structures 430P of the third prism sheet 430 of the backlight module BLU-B may also be disposed opposite to each other; that is, the substrate 421 of the second prism sheet 420 and the substrate 431 of the third prism sheet 430 may also be located between the prism structures 420P and the prism structures 430P.

In particular, the backlight module BLU-A (or the backlight module BLU-B) may switch the light type in correspondence to the operation mode of the display apparatus. For example, when the display apparatus is operated in anti-peep mode, only the first light-emitting elements LED1 are enabled to emit an illumination beam, and the optical components (that is, the second light guide plate LGP2 and the second light-emitting elements LED2) located at one side of the bottom surface LGP1s4 of the first light guide plate LGP1 do not function. At this time, the light beam emitted by the backlight module BLU-A (or the backlight module BLU-B) has a narrower light pattern to help further improve the anti-peep effect of the display apparatus (as shown in FIG. 6A). When the display apparatus is operated in sharing mode, only the second light-emitting elements LED2 are enabled (or the first light-emitting elements LED1 and the second light-emitting elements LED2 are simultaneously enabled) to emit an illumination beam. At this time, the light beam emitted by the backlight module BLU-A (or the backlight module BLU-B) has a wider light pattern to help further increase the viewing angle range of the display apparatus in the direction X (as shown in FIG. 6B).

Some other embodiments are provided below to describe the disclosure in detail, wherein the same members are marked with the same reference numerals, and the description of the same technical content is omitted. For the omitted portions, please refer to the above embodiments, which are not repeated herein.

Figure 7:
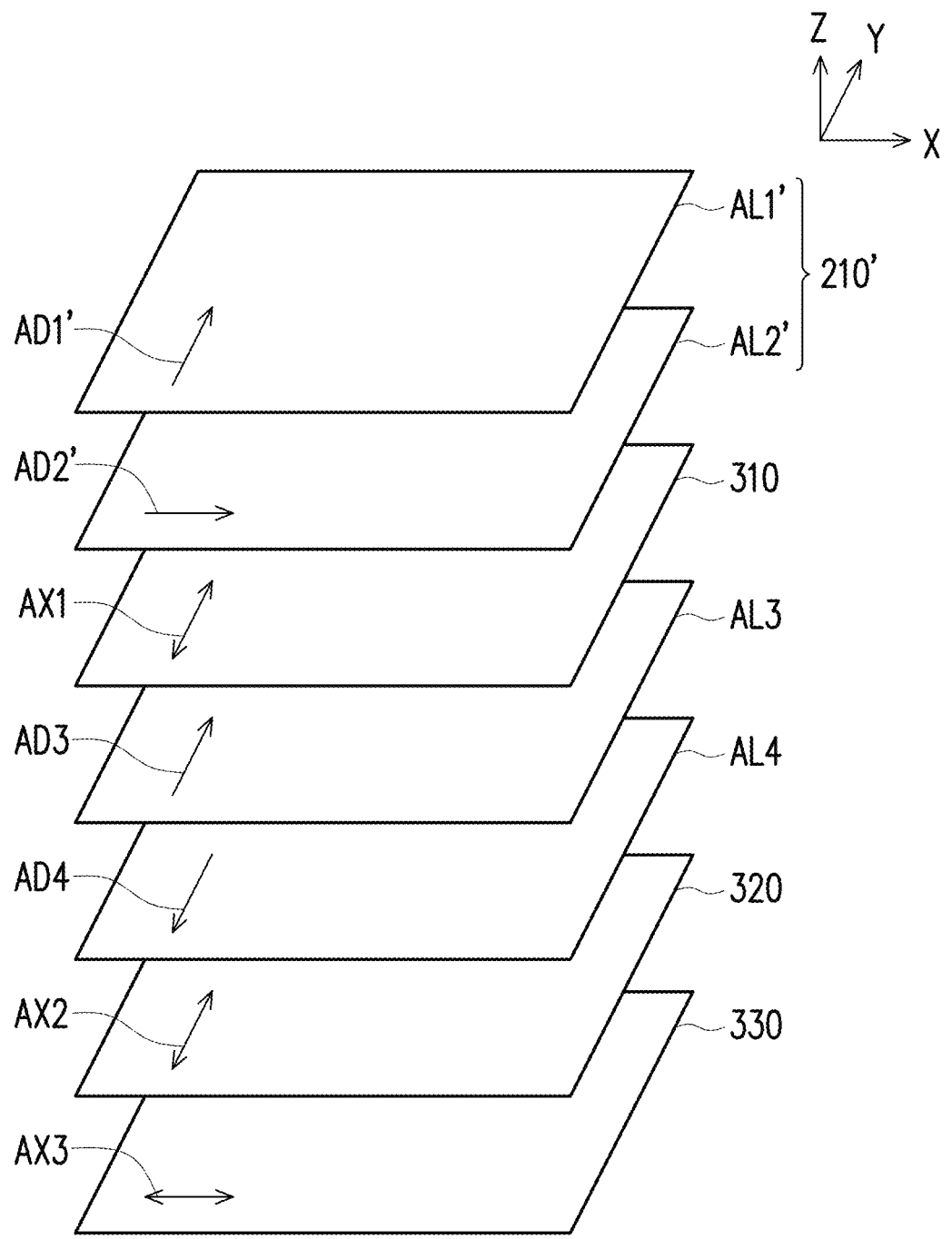
FIG. 7 is a schematic diagram of a portion of the film layers of the display apparatus of the second embodiment of the invention.
Figure 8:
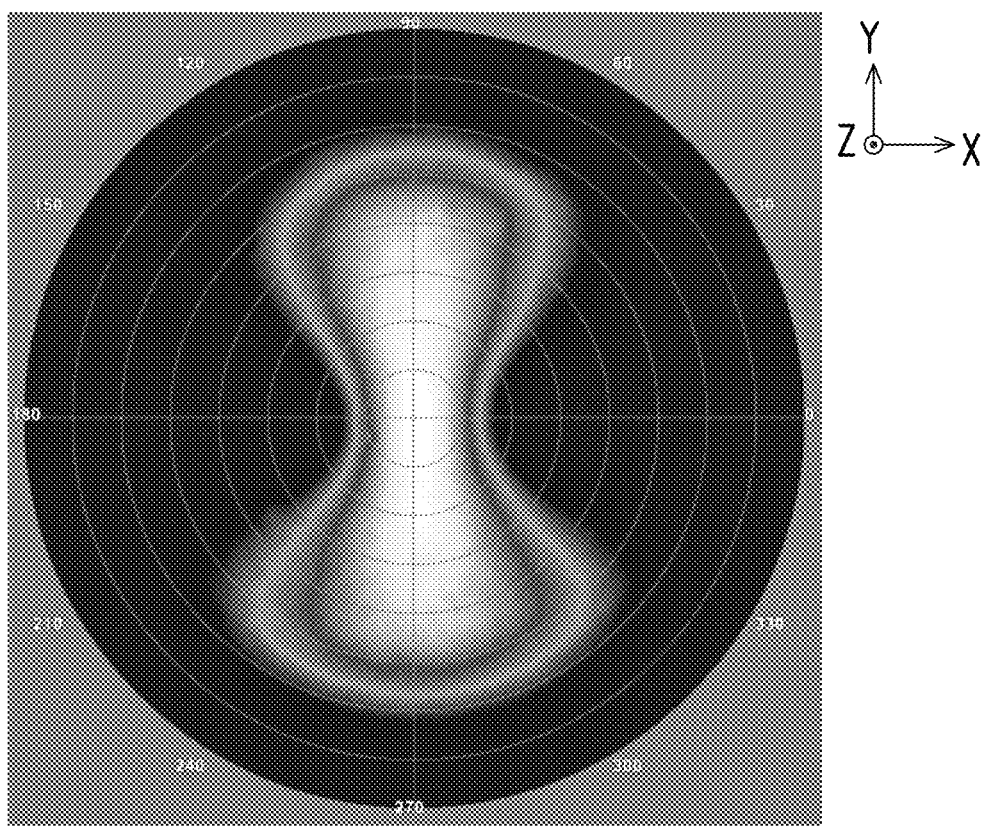
FIG. 8 is a transmittance distribution diagram of the display apparatus of FIG. 7 operated in anti-peep mode.

FIG. 7 is a schematic diagram of a portion of the film layers of the display apparatus of the second embodiment of the invention. FIG. 8 is a transmittance distribution diagram of the display apparatus of FIG. 7 operated in anti-peep mode. Referring to FIG. 7 and FIG. 8, the difference between a display apparatus 10A of the embodiment and the display apparatus 10 of FIG. 2 is: a second alignment direction AD2' of a second alignment layer AL2' of a first electronically controlled viewing angle switch 210' of the display apparatus 10A is an axial direction perpendicular to the first absorption axis AX1 of the first polarizer 310 (that is, a first alignment direction AD1' of a first alignment layer AL1' of the first electronically controlled viewing angle switch 210' is parallel to the axial direction of the first absorption axis AX1 of the first polarizer 310). Accordingly, the viewing angle range of the display apparatus 10A in an oblique azimuth angle (for example, an azimuth angle of 60 degrees or an azimuth angle of 120 degrees on the XY plane) may be enlarged (as shown in FIG. 8).

Figure 9:
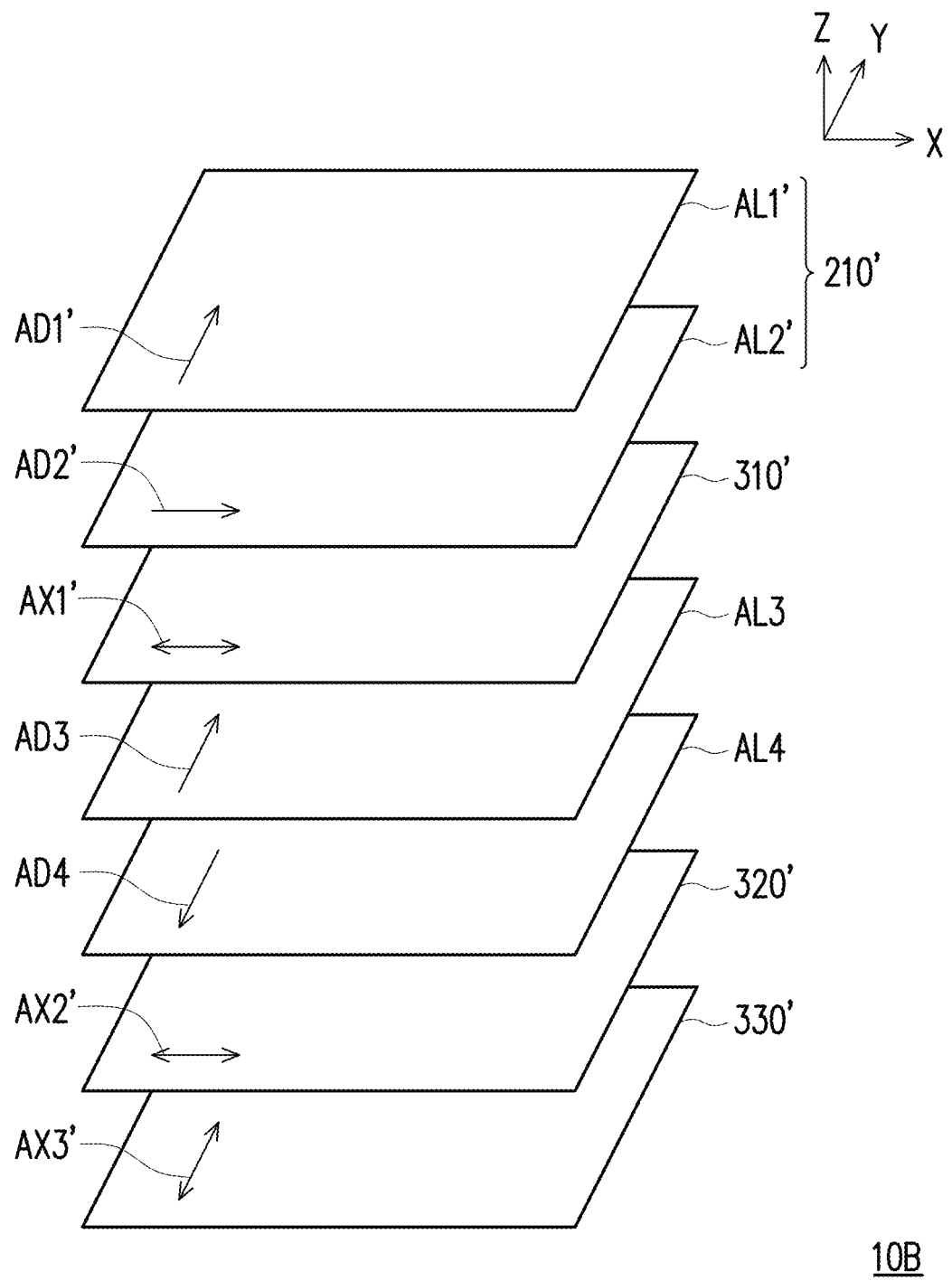
FIG. 9 is a schematic diagram of a portion of the film layers of the display apparatus of the third embodiment of the invention.

FIG. 9 is a schematic diagram of a portion of the film layers of the display apparatus of the third embodiment of the invention. Referring to FIG. 9, the difference between a display apparatus 10B of the embodiment and the display device 10A of FIG. 7 is that the axial direction of the absorption axis of the polarizer is different. Specifically, an axial direction of a third absorption axis AX3' of a third polarizer 330' of the display panel of the display apparatus 10B is parallel to the third alignment direction AD3 of the third alignment layer AL3 and the fourth alignment direction AD4 of the fourth alignment layer AL4. The axial direction of a first absorption axis AX1' of a first polarizer 310' and the axial direction of a second absorption axis AX2' of a second polarizer 320' are perpendicular to the third alignment direction AD3 of the third alignment layer AL3 and the fourth alignment direction AD4 of the alignment layer AL4. In other words, the axial direction of the first absorption axis of the first polarizer (or the second absorption axis of the second polarizer) of the invention may be parallel or perpendicular to the third alignment direction AD3 of the third alignment layer AL3 and the fourth alignment direction AD4 of the fourth alignment layer AL4.

Figure 10A:
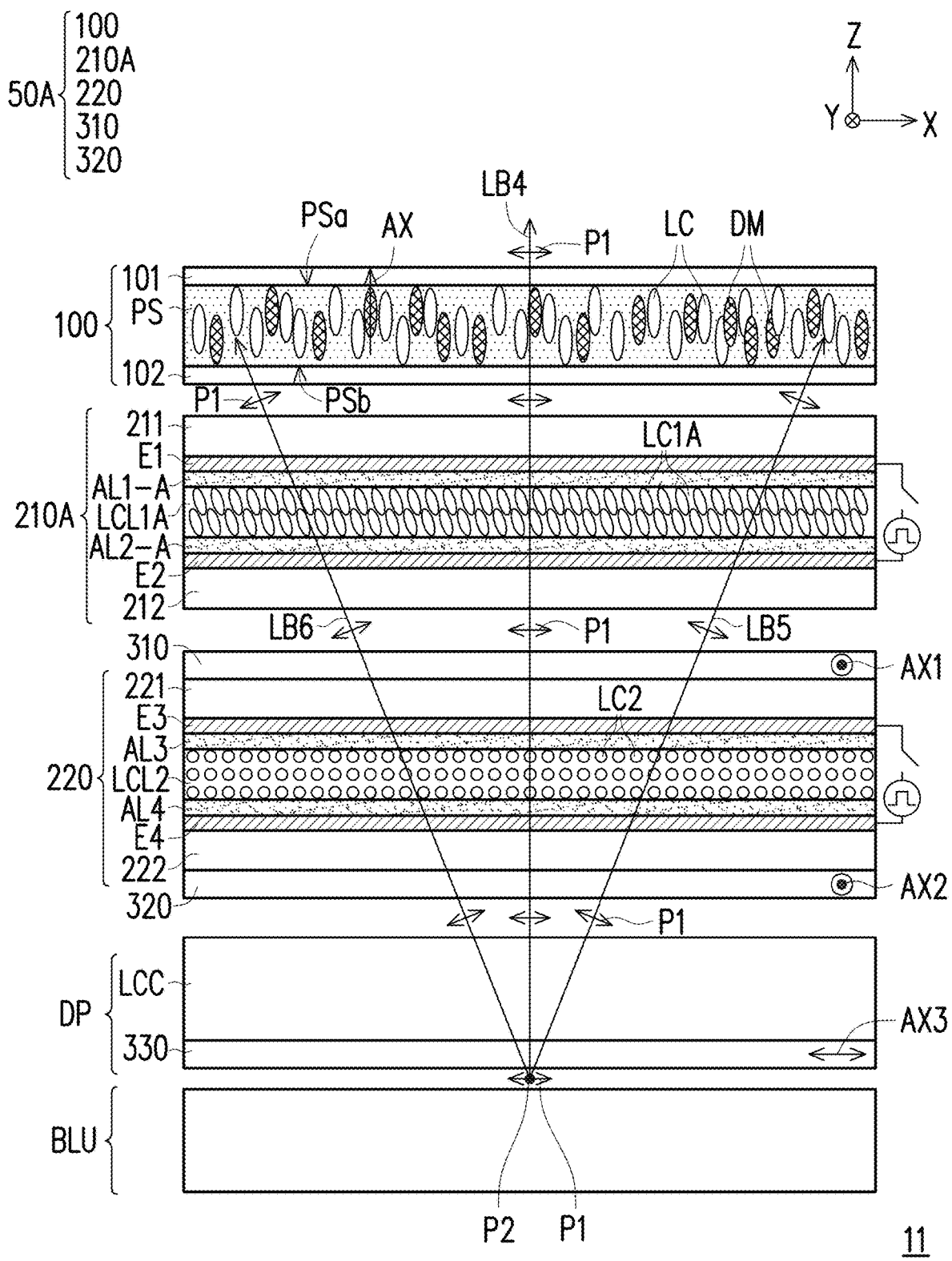
FIG. 10A and FIG. 10B are schematic cross-sectional views of the display apparatus of the fourth embodiment of the invention operated in anti-peep mode and sharing mode.
Figure 10B:
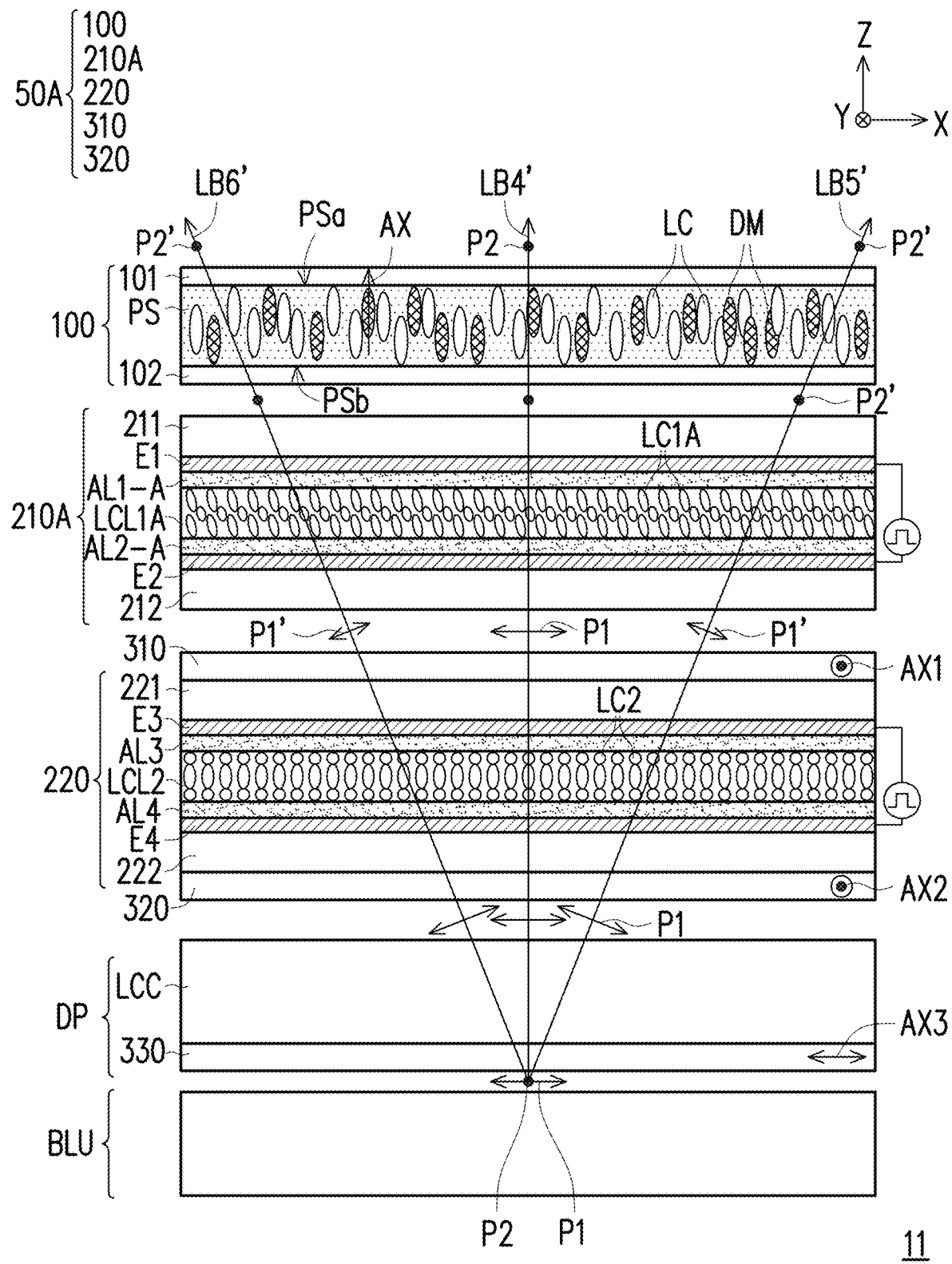
Figure 11:
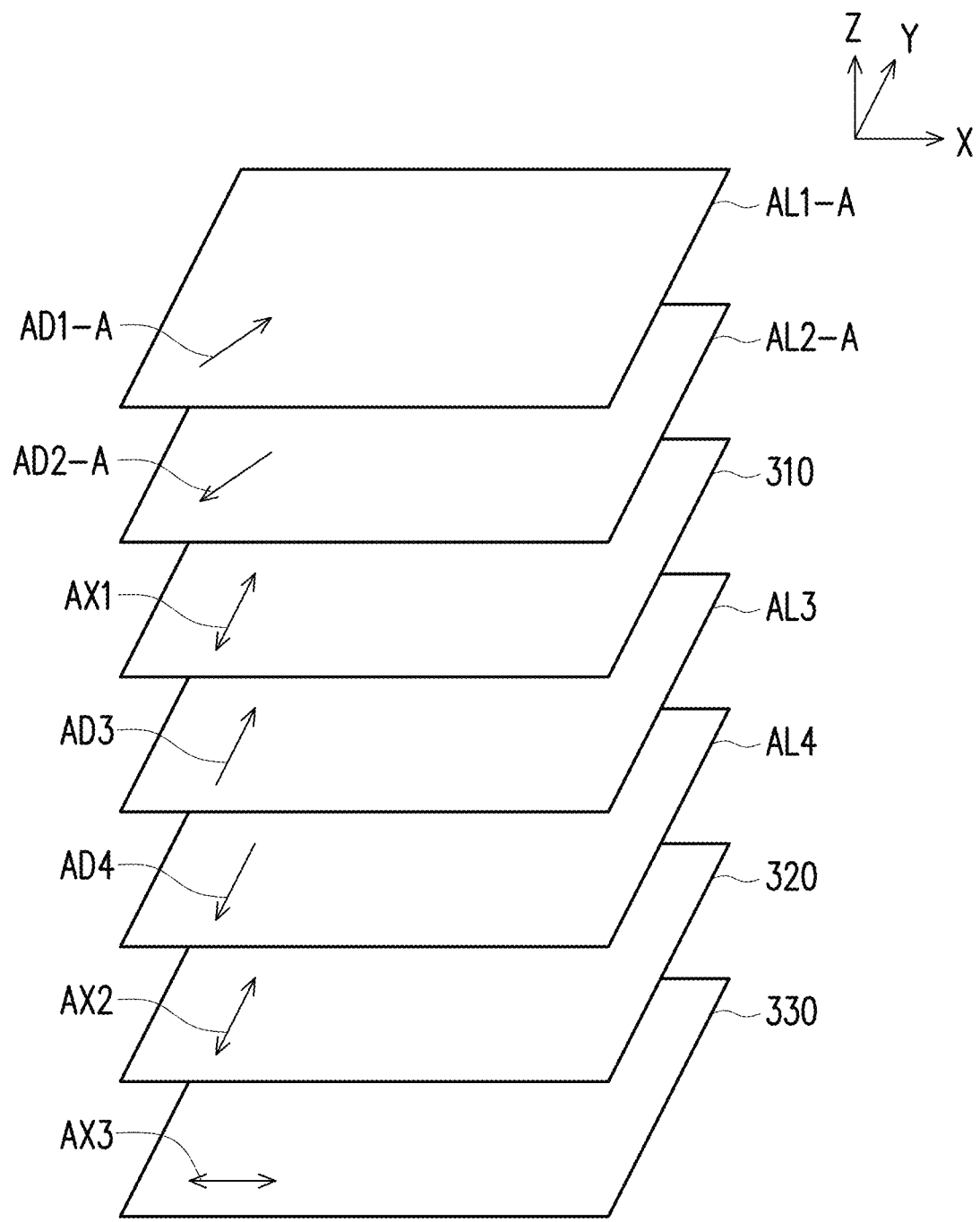
FIG. 11 is a schematic diagram of a portion of the film layers of the display apparatus of FIG. 10A.

FIG. 10A and FIG. 10B are schematic cross-sectional views of the display apparatus of the fourth embodiment of the invention operated in anti-peep mode and sharing mode. FIG. 11 is a schematic diagram of a portion of the film layers of the display apparatus of FIG. 10A. Referring to FIG. 10A, FIG. 10B, and FIG. 11, the difference between a display apparatus 11 of the embodiment and the display apparatus 10 of FIG. 1A and FIG. 1B is that the arrangement of the first liquid crystal layer of the first electronically controlled viewing angle switch is different. In the embodiment, when an electric field is not applied to a first liquid crystal layer LCL1A of a first electronically controlled viewing angle switch 210A of a viewing angle switch module 50A, the arrangement direction of a plurality of liquid crystal molecules LC1A thereof is substantially perpendicular to the film surface of a first alignment layer AL1-A. More specifically, the first electronically controlled viewing angle switch 210A of the embodiment is, for example, a vertical alignment (VA)-type liquid crystal cell. However, the invention is not limited thereto, and in other embodiments, the first electrically controlled viewing angle switch may also be an electrically controlled birefringence (ECB)-type liquid crystal cell.

It should be mentioned that, in the embodiment, a first alignment direction AD1-A of the first alignment layer AL1-A is anti-parallel to a second alignment direction AD2-A of a second alignment layer AL2-A, and the included angle with the axial direction of the first absorption axis AX1 of the first polarizer 310 is 45 degrees. The following exemplifies the anti-peep mode and the sharing mode of the display apparatus 11.

First, non-polarized light beams from the backlight module BLU, such as a light beam LB4 emitted in the forward direction and two light beams LB5 and LB6 emitted obliquely, have the first linear polarization P1 after passing through the display panel DP. For example, the orthogonal projection of the polarization direction of the first linear polarization P1 on the third polarizer 330 may be parallel to the axial direction of the third absorption axis AX3, but is not limited thereto. In other embodiments, the light beam passing through the display panel DP may also have elliptical polarization, and the long axis of the elliptical polarization is substantially perpendicular to the second absorption axis AX2 of the second polarizer 320.

Different from the display apparatus 10 of FIG. 1A, when the display apparatus 11 of the embodiment is operated in anti-peep mode (as shown in FIG. 10A), the first electronically controlled viewing angle switch 210A and the second electronically controlled viewing angle switch 220 are not enabled. That is, a voltage is not applied between the first electrode E1 and the second electrode E2 of the first electronically controlled viewing angle switch 210A, and a voltage is not applied between the third electrode E3 and the fourth electrode E4 of the second electronically controlled viewing angle switch 220.

When an electric field is not applied to the second liquid crystal layer LCL2 of the second electronically controlled viewing angle switch 220, the plurality of liquid crystal molecules LC2 are arranged in a manner parallel to the axial direction of the second absorption axis AX2 of the second polarizer 320 and the film surface of the third alignment layer AL3 (or the fourth alignment layer AL4). Therefore, after the light beam from the display panel DP passes through the second polarizer 320, the second electrically controlled viewing angle switch 220, and the first polarizer 310 in order, the polarization state thereof and the intensity of the polarized electric field are not changed. Similarly, when an electric field is not applied to the first liquid crystal layer LCL1A of the first electronically controlled viewing angle switch 210A, the plurality of liquid crystal molecules LC1A are arranged in a manner perpendicular to the film surface of the first alignment layer AL1-A. Therefore, after the light beam from the second electronically controlled viewing angle switch 220 passes through the first electronically controlled viewing angle switch 210A, the polarization state therefor and the intensity of the polarized electric field are not changed either.

Therefore, the light beam LB4 incident on the viewing angle limiter 100 in the forward direction is not absorbed because the electric field polarization direction thereof is perpendicular to the axial direction of the absorption axis AX of the dye molecules DM. The light components of the light beam LB5 and the light beam LB6 incident obliquely to the viewing angle limiter 100 and having an electric field polarization direction parallel to the absorption axis AX of the dye molecules DM are absorbed by the dye molecules DM. Due to the different optical path lengths of the light beams with different incident angles in the viewing angle limiter 100 and the different included angles between the polarization directions of the electric fields of the light beams and the absorption axis AX, the degree of absorption of the light component of the first linear polarization P1 is also different. For example: the greater the incident angle of the light, the more the light component of the first linear polarization P1 is absorbed by the dye molecules DM. Therefore, the viewing angle limiter 100 may have a light filter effect with a large viewing angle.

Via the light filter effect of the viewing angle limiter 100 at a large viewing angle, the user may operate the display apparatus 11 in a smaller viewing angle range in the direction X to achieve an anti-peep effect.

Furthermore, when the display apparatus 11 is operated in sharing mode (as shown in FIG. 10B), both the first electronically controlled viewing angle switch 210A and the second electronically controlled viewing angle switch 220 are enabled. That is, a voltage is applied between the first electrode E1 and the second electrode E2 of the first electronically controlled viewing angle switch 210A, and a voltage is applied between the third electrode E3 and the fourth electrode E4 of the second electronically controlled viewing angle switch 220.

When an electric field is applied to the second liquid crystal layer LCL2 of the second electronically controlled viewing angle switch 220, a portion of the liquid crystal molecules LC2 is arranged obliquely on the YZ plane (for example, the included angle between the optical axis of the liquid crystal molecules LC1 and the film surface of the third alignment layer AL3 is greater than 45 degrees and less than or equal to 90 degrees). Therefore, after a light beam LB5' and a light beam LB6' incident obliquely pass through the second polarizer 320, the second electrically controlled viewing angle switch 220, and the first polarizer 310 in order, the polarization state thereof is changed into the first linear polarization P1' in which the intensity of the polarized electric field is weakened. After a light beam LB4' incident normally passes through the second polarizer 320, the second electronically controlled viewing angle switch 220, and the first polarizer 310, the polarization state thereof and the intensity of the polarized electric field remain unchanged. That is, the light beam LB4' still has the first linear polarization P1.

When an electric field is applied to the first liquid crystal layer LCL1A of the first electronically controlled viewing angle switch 210A, most of the liquid crystal molecules LC1A are arranged obliquely to the film surfaces of the first alignment layer AL1 and the second alignment layer AL2, and the included angle between the orthogonal projection of the liquid crystal molecules LC1 on the XY plane and the direction X or the direction Y is about 45 degrees, for example. Therefore, the polarization states of the light beam LB4' incident on the first liquid crystal layer LCL1A in the forward direction and the light beam LB5' and the light beam LB6' incident on the first liquid crystal layer LCL1A obliquely are all changed due to the change of the amount of phase retardation of the first liquid crystal layer LCL1A, such as changed from the first linear polarization P1 to the second linear polarization P2 and changed from the first linear polarization P1' to a second linear polarization P2'.

The electric field polarization direction of the light beam from the first electronically controlled viewing angle switch 210A is perpendicular to the axial direction of the absorption axis AX of the dye molecules DM. Therefore, both the light beam LB5' and the light beam LB6' incident obliquely or the light beam LB4' incident normally may pass through the viewing angle limiter 100 without substantial optical energy loss. In other words, the user may operate the display apparatus 10 in the direction X with a larger viewing angle range to achieve the effect of display image sharing.

Figure 12:
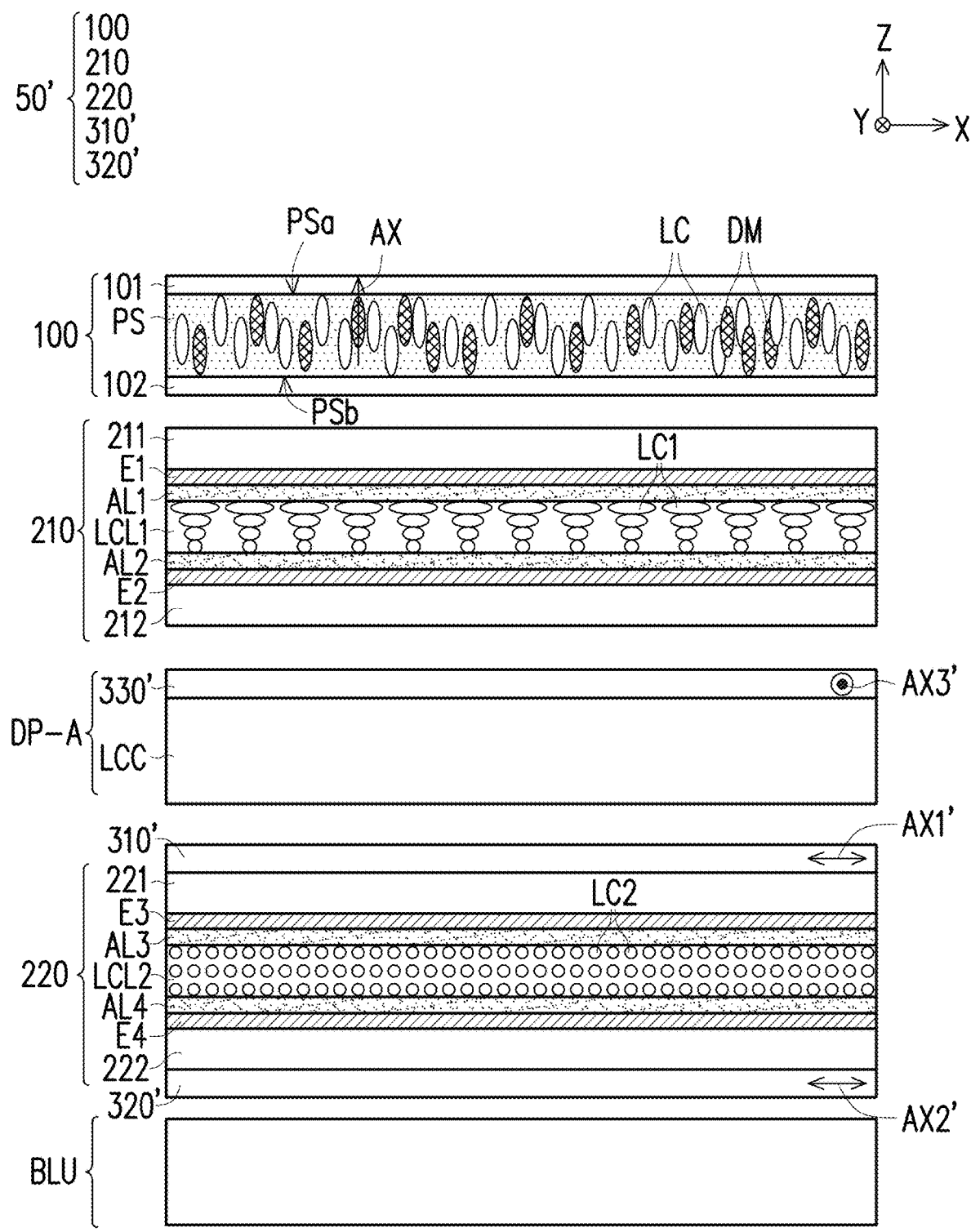
FIG. 12 is a schematic cross-sectional view of the display apparatus of the fifth embodiment of the invention.
Figure 13:
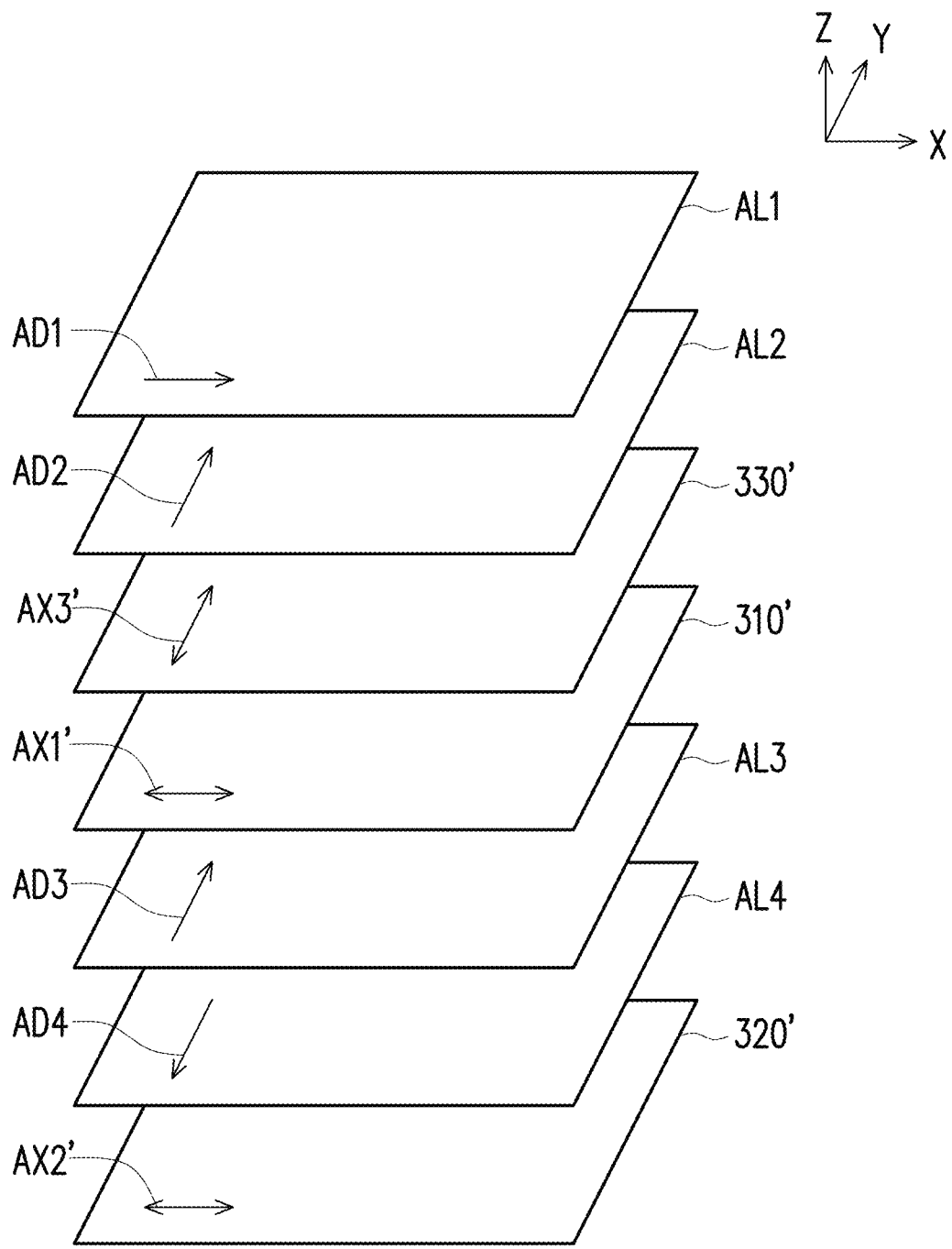
FIG. 13 is a schematic diagram of a portion of the film layers of the display apparatus of FIG. 12.
Figure 14:
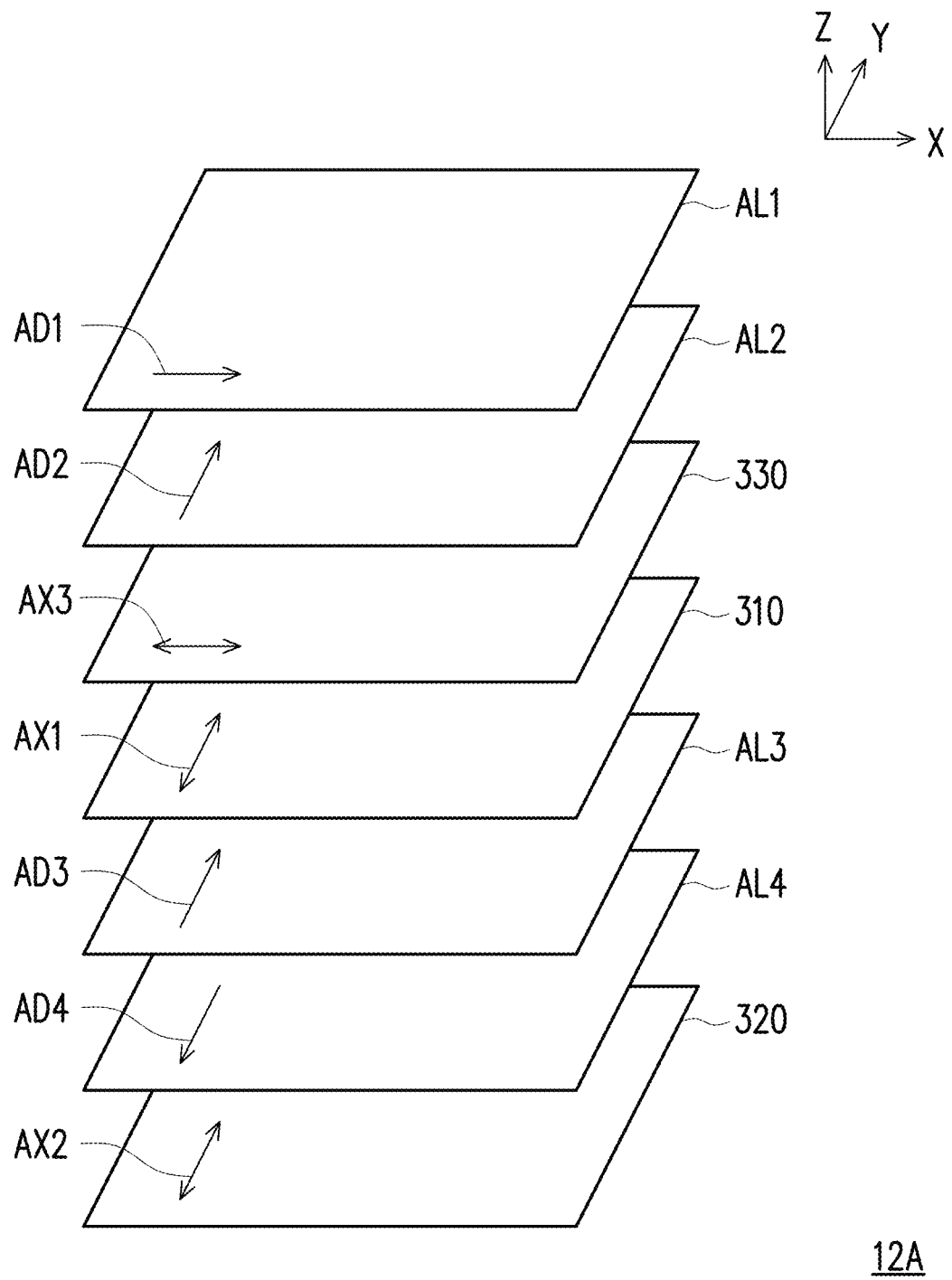
FIG. 14 is a schematic diagram of a portion of the film layers of the display apparatus of the sixth embodiment of the invention.

FIG. 12 is a schematic cross-sectional view of the display apparatus of the fifth embodiment of the invention. FIG. 13 is a schematic diagram of a portion of the film layers of the display apparatus of FIG. 12. FIG. 14 is a schematic diagram of a portion of the film layers of the display apparatus of the sixth embodiment of the invention. Referring to FIG. 12 and FIG. 13, the difference between a display apparatus 12 of the embodiment and the display apparatus 10 of FIG. 1A is the different arrangement of the display panel and the different axial direction arrangement of the absorption axis of the polarizer. Specifically, a display panel DP-A of the display apparatus 12 is located between the first electronically controlled viewing angle switch 210 and the second electronically controlled viewing angle switch 220 of a viewing angle switch module 50', and the display panel DP-A is located between the viewing angle limiter 100 and the backlight module BLU. In the display apparatus 12, for example, the backlight module BLU, the second electronically controlled viewing angle switch 220, the display panel DP-A, the first electronically controlled viewing angle switch 210, and the viewing angle limiter 100 are arranged in order to be overlapped. It should be noted that the third polarizer 330' of the display panel DP-A is disposed at one side of the liquid crystal cell LCC away from the second electronically controlled viewing angle switch 220.

Moreover, in the embodiment, the axial direction of the third absorption axis AX3' of the third polarizer 330' may be parallel to the third alignment direction AD3 of the third alignment layer AL3 and the fourth alignment direction AD4 of the fourth alignment layer AL4, and the axial direction of the first absorption axis AX1' of the first polarizer 310' and the axial direction of the second absorption axis AX2' of the second polarizer 320' are perpendicular to the axial direction of the third absorption axis AX3' of the third polarizer 330'. However, the invention is not limited thereto, and in other embodiments, the arrangement relationship between the axial direction of the absorption axis of each of the plurality of polarizers of a display apparatus 12A and the alignment direction of each of the alignment layers of the two electronically controlled viewing angle switches (as shown in FIG. 14) may also be similar to the display apparatus 10 of FIG. 2.

Since the operation mode of the display apparatus 12 of the embodiment is similar to the operation mode of the display apparatus 10 of FIG. 1A and FIG. 1B, for detailed description, please refer to the relevant paragraphs of the above embodiments, which is not repeated herein.

Figure 15:
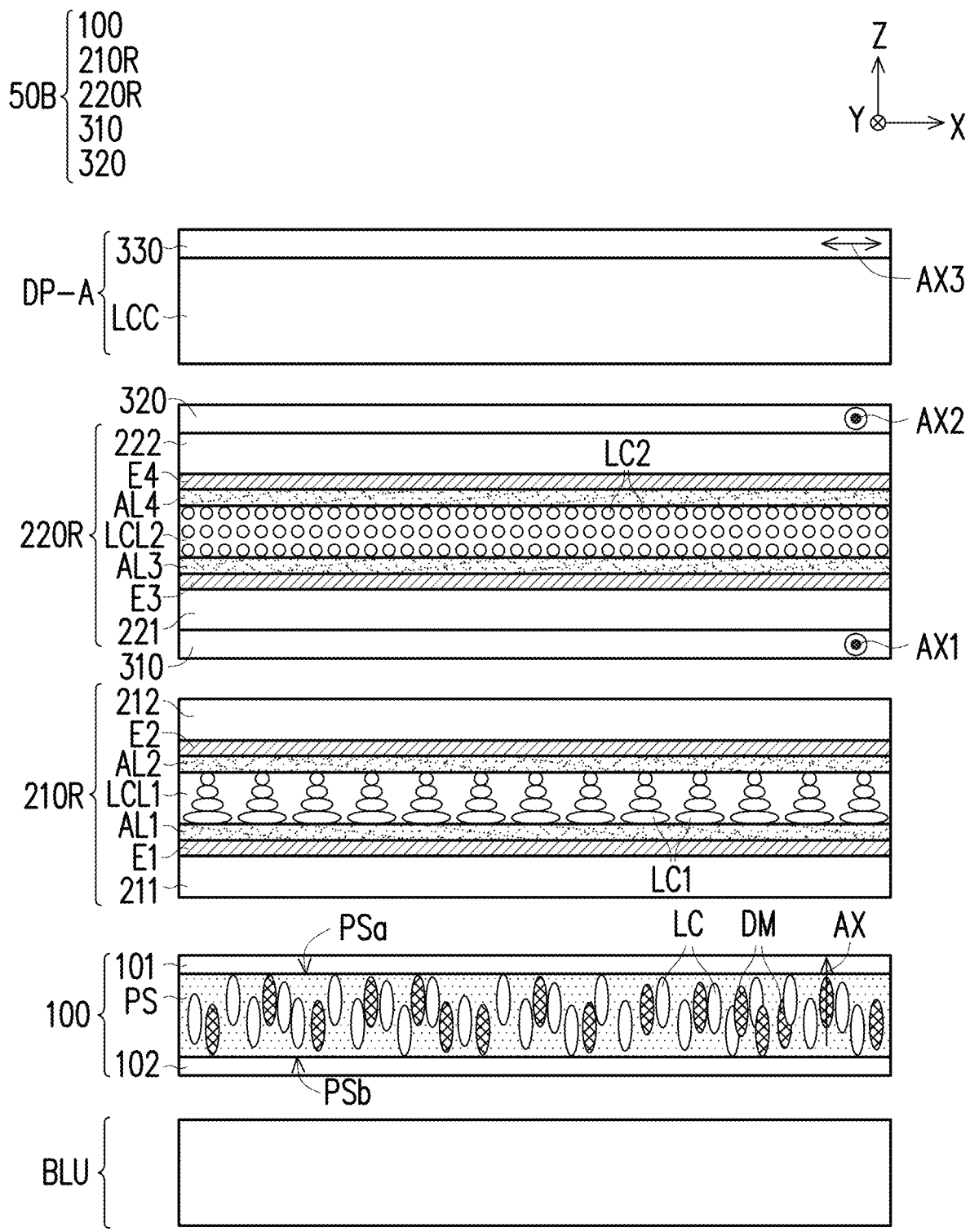
FIG. 15 is a schematic cross-sectional view of the display apparatus of the seventh embodiment of the invention.
Figure 16:
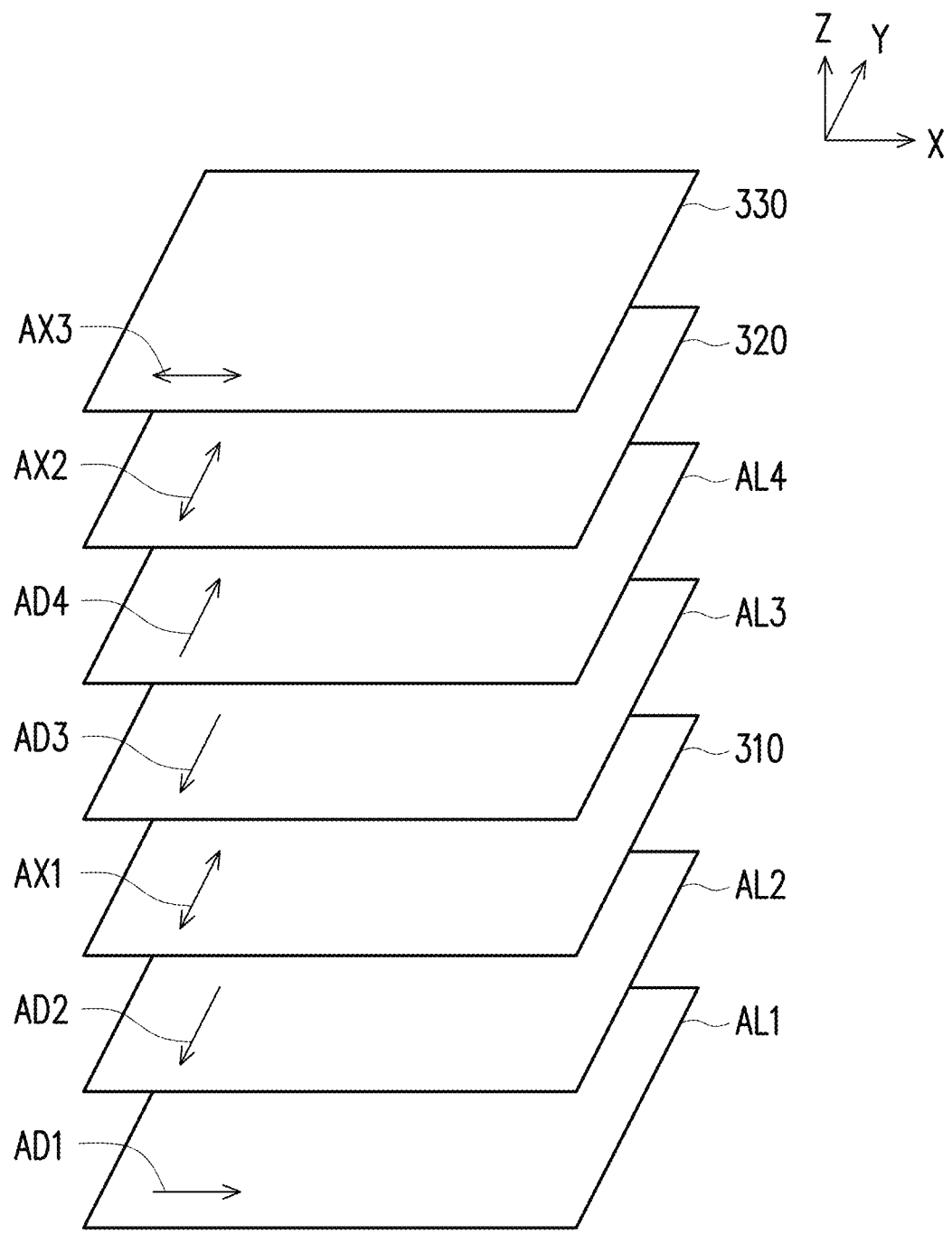
FIG. 16 is a schematic diagram of a portion of the film layers of the display apparatus of FIG. 15.

FIG. 15 is a schematic cross-sectional view of the display apparatus of the seventh embodiment of the invention. FIG. 16 is a schematic diagram of a portion of the film layers of the display apparatus of FIG. 15. Referring to FIG. 15 and FIG. 16, the main difference between a display apparatus 13 of the embodiment and the display apparatus 10 of FIG. 1A is the configuration of the display panel is different. In the embodiment, a viewing angle switch module 50B of the display apparatus 13 may be optionally disposed between the display panel DP-A and the backlight module BLU, wherein a first electronically controlled viewing angle switch 210R and the viewing angle limiter 100 are located between the display panel DP-A and the backlight module BLU, and a second electronically controlled viewing angle switch 220R is located between the display panel DP-A and the first electronically controlled viewing angle switch 210R. In the display apparatus 13, for example, the backlight module BLU, the viewing angle limiter 100, the first electronically controlled viewing angle switch 210R, the second electronically controlled viewing angle switch 220R, and the display panel DP-A are arranged in order to be overlapped. It should be noted that, the arrangement order of the film layers of the first electronically controlled viewing angle switch 210R and the second electronically controlled viewing angle switch 220R in the light beam traveling direction of the embodiment is opposite to the arrangement order of the film layers of the first electronically controlled viewing angle switch 210 and the second electronically controlled viewing angle switch 220 of the display apparatus 10 of FIG. 1A in the light beam traveling direction.

In the embodiment, since the viewing angle limiter 100 is disposed closer to the position of the backlight module BLU, a portion of the light beam from the backlight module BLU may have a linear polarization state after passing through the viewing angle limiter 100, and another portion of the light beam may still remain unpolarized after passing through the viewing angle limiter 100.

For example, the light beam normally incident on the viewing angle limiter 100 is not absorbed because the optical path thereof is parallel to the axial direction of the absorption axis AX of the dye molecules DM, so that the forward light beam passing through the viewing angle limiter 100 still has an unpolarized state. At least a portion of the light energy of the light beam incident obliquely to the viewing angle limiter 100 is absorbed by the dye molecules DM because the light path thereof is intersected with the axial direction of the absorption axis AX of the dye molecules DM, so that the oblique light beam passing through the viewing angle limiter 100 has different degrees of polarization. More specifically, the degree of polarization of the light beam passing through the viewing angle limiter 100 is increased as the incident angle of the light beam is increased.

Since the working principle of each of the first electronically controlled viewing angle switch 210R and the second electronically controlled viewing angle switch 220R of the viewing angle switch module 50B of the embodiment for oblique light beams in different modes is similar to that of the viewing angle switch module 50 of FIG. 1A, for detailed description, please refer to the relevant paragraphs of the above embodiments, which is not repeated herein.

Figure 17:
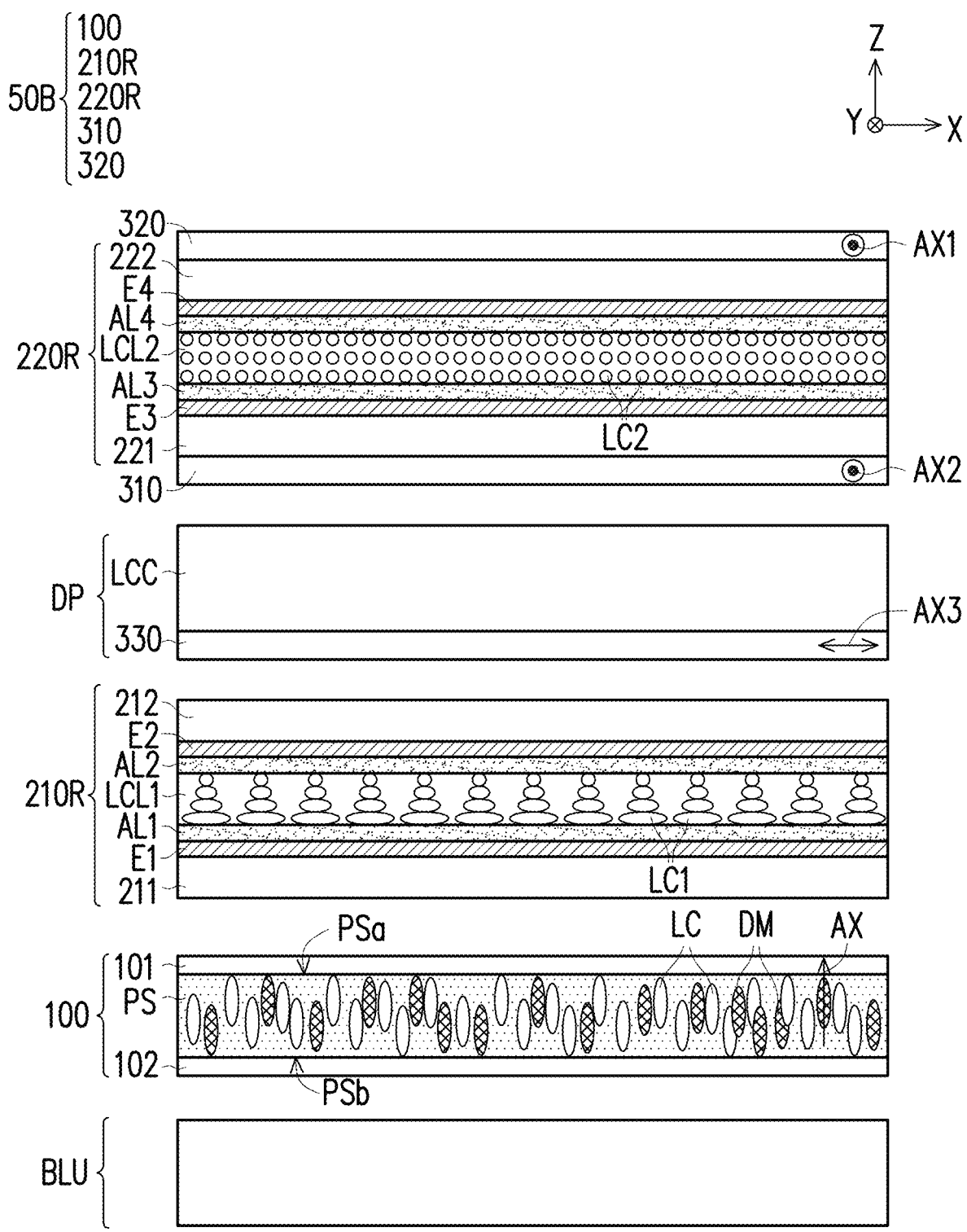
FIG. 17 is a schematic cross-sectional view of the display apparatus of the eighth embodiment of the invention.
Figure 18:
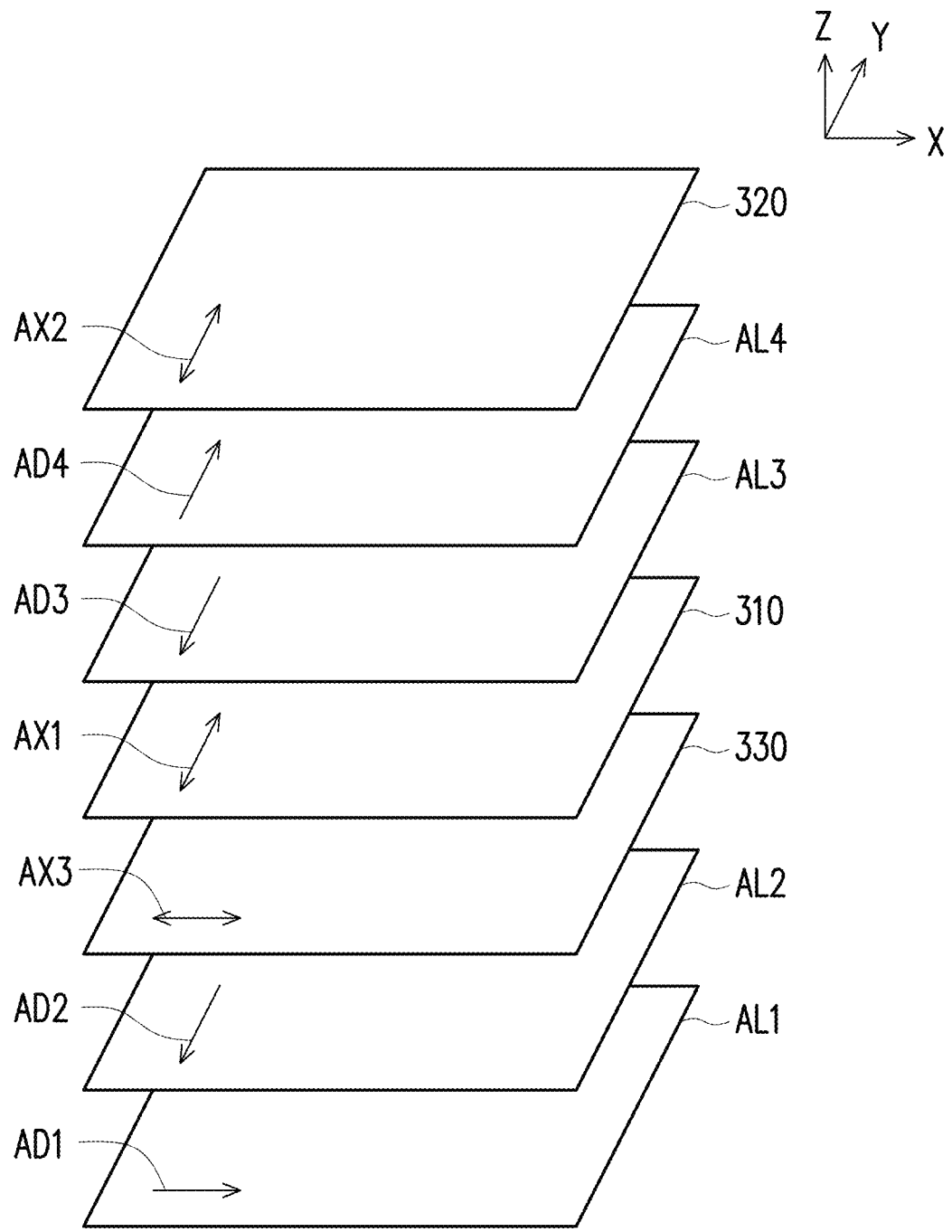
FIG. 18 is a schematic diagram of a portion of the film layers of the display apparatus of FIG. 17.

FIG. 17 is a schematic cross-sectional view of the display apparatus of the eighth embodiment of the invention. FIG. 18 is a schematic diagram of a portion of the film layers of the display apparatus of FIG. 17. Referring to FIG. 17 and FIG. 18, the difference between a display apparatus 14 of the embodiment and the display apparatus 13 of FIG. 15 is that the display panel DP of the display apparatus 14 is disposed between the first electronically controlled viewing angle switch 210R and the second electronically controlled viewing angle switch 220R. In the display apparatus 14, for example, the backlight module BLU, the viewing angle limiter 100, the first electronically controlled viewing angle switch 210R, the display panel DP, and the second electronically controlled viewing angle switch 220R are arranged in order to be overlapped. Since the operating principle of the display apparatus 14 of the embodiment in different modes is similar to that of the display apparatus 13 of FIG. 15, for detailed description, please refer to the relevant paragraphs of the above embodiments, which is not repeated herein.

Figure 19:
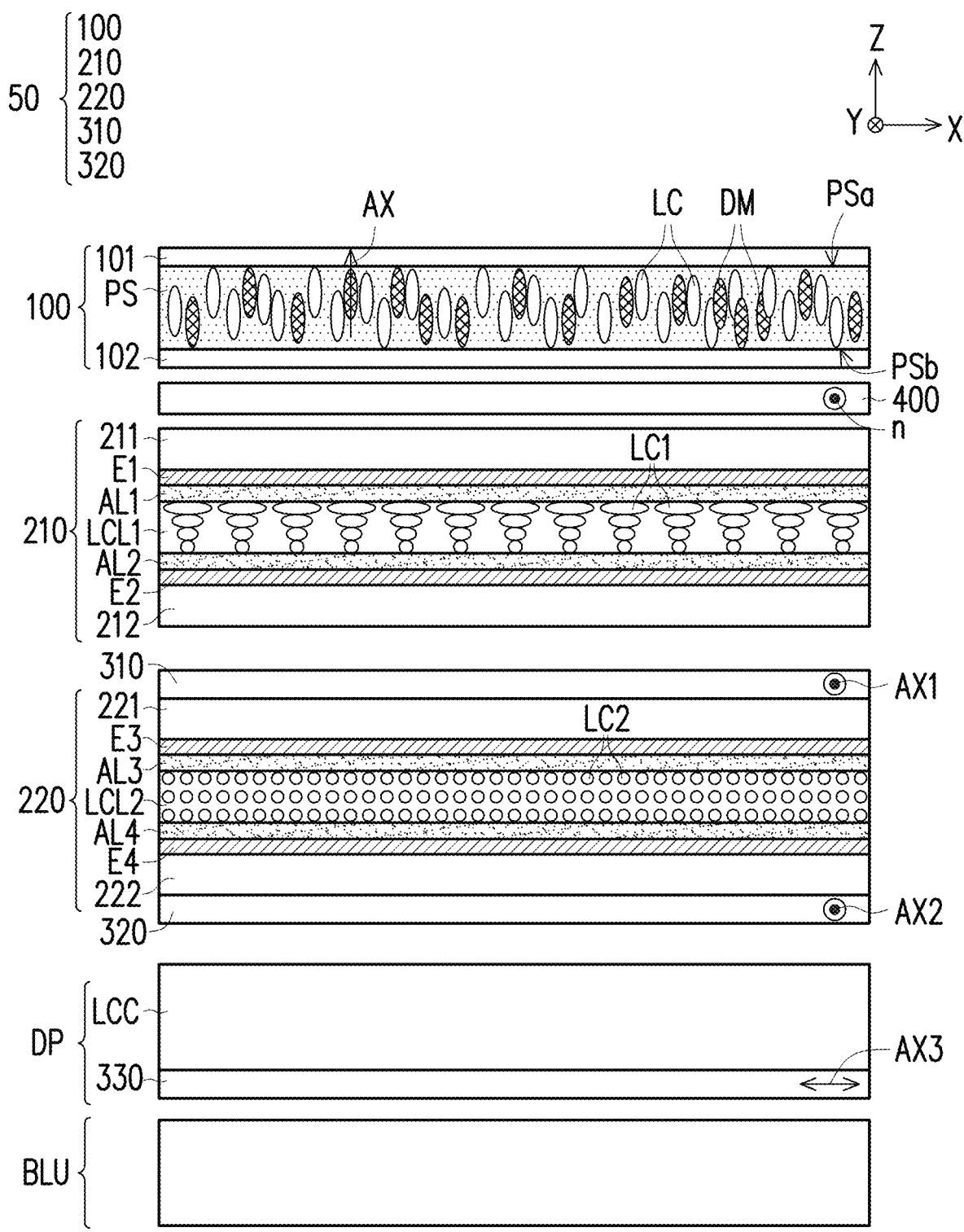
FIG. 19 is a schematic cross-sectional view of the display apparatus of the ninth embodiment of the invention.
Figure 20:
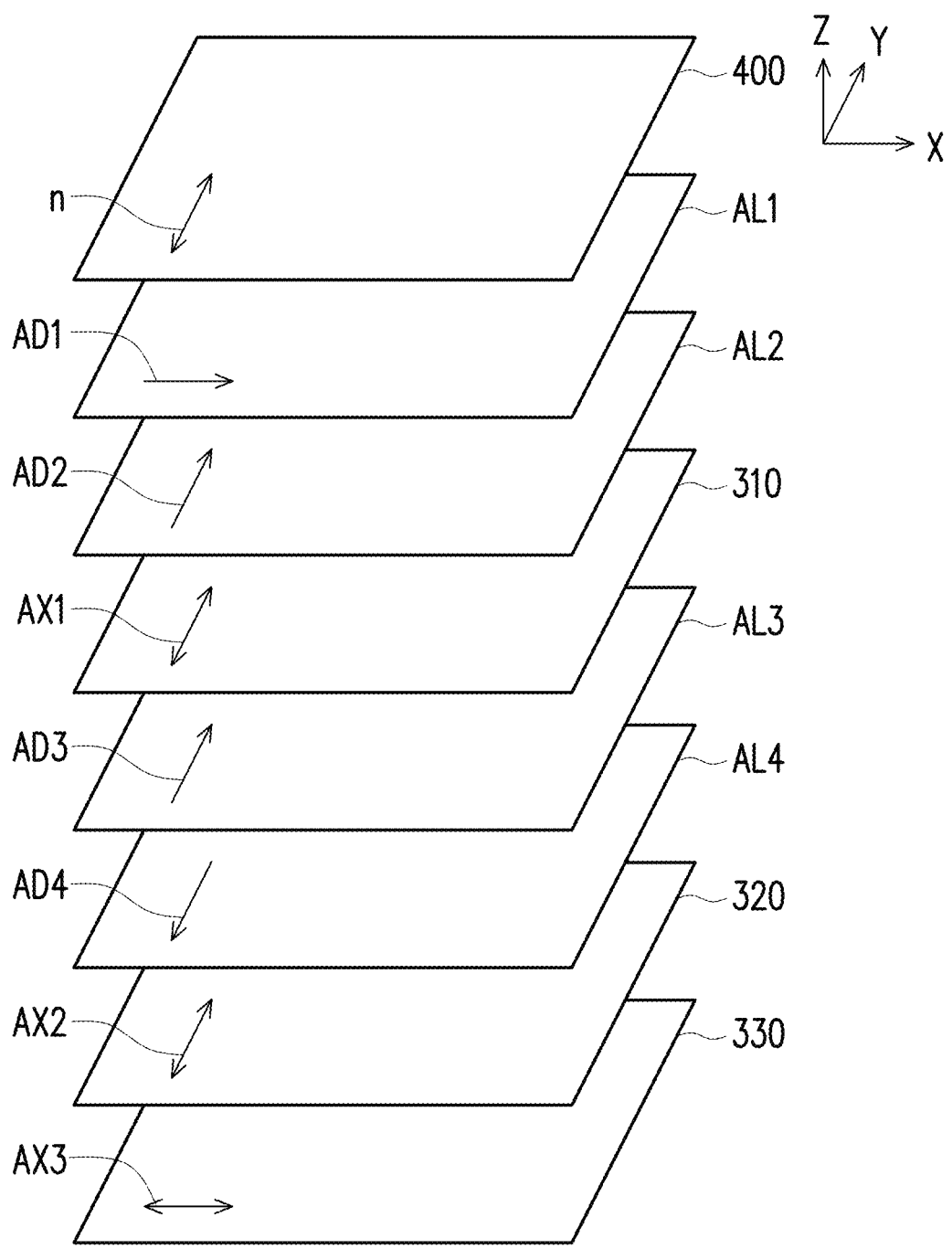
FIG. 20 is a schematic diagram of a portion of the film layers of the display apparatus of FIG. 19.

FIG. 19 is a schematic cross-sectional view of the display apparatus of the ninth embodiment of the invention. FIG. 20 is a schematic diagram of a portion of the film layers of the display apparatus of FIG. 19. Referring to FIG. 19 and FIG. 20, the difference between a display apparatus 15 of the embodiment and the display apparatus 10 of FIG. 1A is the display apparatus 15 further includes a compensation film 400 disposed between the viewing angle limiter 100 and the first electronically controlled viewing angle switch 210. For example, in the embodiment, the axial direction of an optical axis n of the compensation film 400 may be parallel to the axial direction of the first absorption axis AX1 of the first polarizer 310, but is not limited thereto. In other embodiments, the axial direction of the optical axis of the compensation film may also be perpendicular to the axial direction of the first absorption axis AX1 of the first polarizer 310. Via the arrangement of the compensation film 400, the anti-peep range or the viewing angle range of the display apparatus 15 in a specific direction (for example, the direction X) may be expanded or reduced.

Based on the above, in the viewing angle switch module and the display apparatus of an embodiment of the invention, via the absorption characteristics of the viewing angle limiter in a specific direction and the cooperation with the two electronically controlled viewing angle switches, the light energy utilization rate of the viewing angle switch module may be increased, thereby reducing the operating energy consumption of the display apparatus. At the same time, the anti-peep effect of the display apparatus under a large viewing angle may also be improved. Moreover, the electronically controllable features of the two electronically controlled viewing angle switches make it extremely convenient for the display apparatus to switch between antipeep mode and sharing mode.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A display apparatus, wherein the display apparatus comprises a backlight module, a viewing angle limiter, a first electronically controlled viewing angle switch, a second electronically controlled viewing angle switch, a first polarizer, a second polarizer, and a display panel, wherein:
   the viewing angle limiter is overlapped with the backlight module and has an absorption axis, and an axial direction of the absorption axis is parallel to a thickness direction of the viewing angle limiter;
   the first electronically controlled viewing angle switch is overlapped with the viewing angle limiter, and comprises:
      a first liquid crystal layer; and
      a first alignment layer and a second alignment layer, wherein the first liquid crystal layer is sandwiched between the first alignment layer and the second alignment layer, and a first alignment direction of the first alignment layer is substantially parallel or perpendicular to a second alignment direction of the second alignment layer;
   the second electronically controlled viewing angle switch is overlapped with the first electronically controlled viewing angle switch, and comprises:
      a second liquid crystal layer; and
      a third alignment layer and a fourth alignment layer, wherein the second liquid crystal layer is sandwiched between the third alignment layer and the fourth alignment layer, and a third alignment direction of the third alignment layer is parallel to a fourth alignment direction of the fourth alignment layer; the first polarizer is disposed between the first electronically controlled viewing angle switch and the second electronically controlled viewing angle switch, and the first electronically controlled viewing angle switch is located between the viewing angle limiter and the first polarizer;
   the second polarizer is disposed at one side of the second electronically controlled viewing angle switch away from the first electronically controlled viewing angle switch, wherein an axial direction of a first absorption axis of the first polarizer is parallel to an axial direction of a second absorption axis of the second polarizer; and
   the display panel is overlapped with the backlight module.

2. The display apparatus of claim 1, wherein an included angle between the first alignment direction of the first alignment layer or the second alignment direction of the second alignment layer and the third alignment direction of the third alignment layer is between 0 degrees and 45 degrees.

3. The display apparatus of claim 1, wherein the viewing angle limiter comprises:
   a polymer substrate; and
   a plurality of dye molecules dispersed in the polymer substrate, wherein the plurality of dye molecules have a first absorption coefficient in the thickness direction of the viewing angle limiter, the plurality of dye molecules have a second absorption coefficient perpendicular to the thickness direction, and a ratio of the first absorption coefficient to the second absorption coefficient is between 2 and 10000.

4. The display apparatus of claim 1, wherein the second electronically controlled viewing angle switch is located between the display panel and the first electronically controlled viewing angle switch, and the display panel is located between the viewing angle limiter and the backlight module.

5. The display apparatus of claim 4, wherein the first alignment direction of the first alignment layer is perpendicular to the second alignment direction of the second alignment layer, and the second alignment direction of the second alignment layer is parallel or perpendicular to the axial direction of the first absorption axis of the first polarizer.

6. The display apparatus of claim 4, wherein the first alignment direction of the first alignment layer is parallel to the second alignment direction of the second alignment layer, and an included angle between the first alignment direction of the first alignment layer and the axial direction of the first absorption axis of the first polarizer is 45 degrees.

7. The display apparatus of claim 1, wherein the display panel is located between the first electronically controlled viewing angle switch and the second electronically controlled viewing angle switch, and the display panel is located between the viewing angle limiter and the backlight module.

8. The display apparatus of claim 1, wherein the first electronically controlled viewing angle switch and the viewing angle limiter are located between the display panel and the backlight module.

9. The display apparatus of claim 8, wherein the second electronically controlled viewing angle switch is located between the display panel and the first electronically controlled viewing angle switch.

10. The display apparatus of claim 8, wherein the display panel is located between the first electronically controlled viewing angle switch and the second electronically controlled viewing angle switch.

11. The display apparatus of claim 1, further comprising:
   a compensation film disposed between the viewing angle limiter and the first electronically controlled viewing angle switch, wherein an axial direction of an optical axis of the compensation film is parallel or perpendicular to the axial direction of the first absorption axis of the first polarizer.

12. A viewing angle switch module, wherein the viewing angle switch module comprises a viewing angle limiter, a first electronically controlled viewing angle switch, a second electronically controlled viewing angle switch, a first polarizer, and a second polarizer, wherein:
   the viewing angle limiter has an absorption axis, and an axial direction of the absorption axis is parallel to a thickness direction of the viewing angle limiter;
   the first electronically controlled viewing angle switch is overlapped with the viewing angle limiter, and comprises:
      a first liquid crystal layer; and
      a first alignment layer and a second alignment layer, wherein the first liquid crystal layer is sandwiched between the first alignment layer and the second alignment layer, and a first alignment direction of the first alignment layer is substantially parallel or perpendicular to a second alignment direction of the second alignment layer;

the second electronically controlled viewing angle switch is overlapped with the first electronically controlled viewing angle switch, and comprises:

a second liquid crystal layer; and a third alignment layer and a fourth alignment layer, wherein the second liquid crystal layer is sandwiched between the third alignment layer and the fourth alignment layer, and a third alignment direction of the third alignment layer is parallel to a fourth alignment direction of the fourth alignment layer;

the first polarizer is disposed between the first electronically controlled viewing angle switch and the second electronically controlled viewing angle switch, and the first electronically controlled viewing angle switch is located between the viewing angle limiter and the first polarizer; and the second polarizer is disposed at one side of the second electronically controlled viewing angle switch away from the first electronically controlled viewing angle switch, wherein an axial direction of a first absorption axis of the first polarizer is parallel to an axial direction of a second absorption axis of the second polarizer.

13. The viewing angle switch module of claim 12, further comprising a backlight module, wherein the second electronically controlled viewing angle switch is located between the backlight module and the first electronically controlled viewing angle switch.

* * * * *